(12) United States Patent
Curro et al.

(10) Patent No.: US 8,337,190 B2
(45) Date of Patent: Dec. 25, 2012

(54) METHOD AND APPARATUS FOR INCREMENTALLY STRETCHING A WEB

(75) Inventors: John Joseph Curro, Cincinnati, OH (US); John Brian Strube, Okeana, OH (US); Timothy Ian Mullane, Union, KY (US); Jill Marlene Orr, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/212,513

(22) Filed: Aug. 18, 2011

(65) Prior Publication Data
US 2012/0003345 A1  Jan. 5, 2012

Related U.S. Application Data

(60) Division of application No. 12/045,969, filed on Mar. 11, 2008, now Pat. No. 8,021,591, which is a continuation-in-part of application No. 11/717,557, filed on Mar. 13, 2007, now abandoned.

(51) Int. Cl.
*B29C 55/18* (2006.01)
(52) U.S. Cl. .......................... 425/335; 425/373; 425/371
(58) Field of Classification Search .................. 425/335, 425/373, 371
See application file for complete search history.

(56) References Cited

U.S. PATENT DOCUMENTS

| | | |
|---|---|---|
| 3,032,815 A | 5/1962 | Heinz |
| 3,157,551 A | 11/1964 | Granozio |
| 3,165,783 A | 1/1965 | Nerio |
| 3,516,116 A | 6/1970 | Ladyjenski |
| 3,557,407 A | 1/1971 | Lemelson |
| 4,035,881 A | 7/1977 | Zocher |
| 4,306,932 A | 12/1981 | Bradatsch et al. |
| 4,621,397 A | 11/1986 | Schrenk |
| 5,143,679 A | 9/1992 | Weber et al. |
| 5,517,737 A | 5/1996 | Viltro et al. |
| 5,518,801 A | 5/1996 | Chappell et al. |
| 5,628,097 A | 5/1997 | Benson et al. |
| 5,658,639 A | 8/1997 | Curro et al. |
| 5,691,035 A | 11/1997 | Chappell et al. |
| 5,723,087 A | 3/1998 | Chappell et al. |
| 5,891,544 A | 4/1999 | Chappell et al. |
| 5,914,084 A | 6/1999 | Benson et al. |
| 5,916,661 A | 6/1999 | Benson et al. |
| 5,993,432 A | 11/1999 | Lodge et al. |
| 6,027,483 A | 2/2000 | Chappell et al. |
| 6,114,263 A | 9/2000 | Benson et al. |
| 6,129,801 A | 10/2000 | Benson et al. |

(Continued)

FOREIGN PATENT DOCUMENTS

WO  WO-2004/020174  3/2004

(Continued)

*Primary Examiner* — Joseph Del Sole
*Assistant Examiner* — Kimberly A Stewart
(74) *Attorney, Agent, or Firm* — Jeffrey V Bamber; Jay A Krebs

(57) ABSTRACT

A method and apparatus is provided which uses activation members for incrementally stretching a web at a low strain rate. The activation members include an activation belt and a single activation member wherein the activation belt and single activation member comprise a plurality of teeth and grooves that complement and engage one another at a depth of engagement in a deformation zone. The depth of engagement can be controlled to increase linearly over at least a portion of the deformation zone such that a web interposed between the activation belt and the single activation member in the deformation zone is incrementally stretched at a low rate of strain.

14 Claims, 21 Drawing Sheets

U.S. PATENT DOCUMENTS

| | | |
|---|---|---|
| 6,171,682 B1 | 1/2001 | Raidel et al. |
| 6,287,407 B1 | 9/2001 | Stein et al. |
| 6,368,444 B1 | 4/2002 | Jameson et al. |
| 6,383,431 B1 | 5/2002 | Dobrin et al. |
| 6,506,329 B1 | 1/2003 | Curro et al. |
| 6,548,147 B1 | 4/2003 | Raidel et al. |
| 6,605,172 B1 | 8/2003 | Anderson et al. |
| 6,620,485 B1 | 9/2003 | Benson et al. |
| 6,716,498 B2 | 4/2004 | Curro et al. |
| 6,726,870 B1 | 4/2004 | Benson et al. |
| 6,808,791 B2 | 10/2004 | Curro et al. |
| 6,884,494 B1 | 4/2005 | Curro et al. |
| 7,037,569 B2 | 5/2006 | Curro et al. |
| 7,172,801 B2 | 2/2007 | Hoying et al. |
| 7,198,742 B2 | 4/2007 | Gerndt |
| 8,021,591 B2 | 9/2011 | Curro et al. |
| 2002/0016122 A1 | 2/2002 | Curro et al. |
| 2002/0022427 A1 | 2/2002 | Curro et al. |
| 2002/0034913 A1 | 3/2002 | Curro et al. |
| 2002/0039867 A1 | 4/2002 | Curro et al. |
| 2002/0105110 A1 | 8/2002 | Dobrin et al. |
| 2002/0119720 A1 | 8/2002 | Arora et al. |
| 2003/0021951 A1 | 1/2003 | Desai et al. |
| 2003/0028165 A1 | 2/2003 | Curro et al. |
| 2003/0088228 A1 | 5/2003 | Desai et al. |
| 2003/0224146 A1 | 12/2003 | Raidel et al. |
| 2004/0010442 A1 | 1/2004 | Merker et al. |
| 2004/0110442 A1 | 6/2004 | Rhim et al. |
| 2004/0131820 A1 | 7/2004 | Turner et al. |
| 2004/0265534 A1 | 12/2004 | Curro et al. |
| 2005/0123726 A1 | 6/2005 | Broering et al. |
| 2005/0133151 A1 | 6/2005 | Maldonado Pacheco et al. |
| 2005/0140057 A1 | 6/2005 | Gerndt |
| 2005/0230034 A1 | 10/2005 | Arora et al. |
| 2005/0241750 A1 | 11/2005 | McCormack et al. |
| 2006/0087053 A1 | 4/2006 | O'Donnell et al. |
| 2006/0148354 A1 | 7/2006 | Shelley et al. |
| 2006/0148361 A1 | 7/2006 | Ng et al. |
| 2006/0151914 A1 | 7/2006 | Gerndt et al. |

FOREIGN PATENT DOCUMENTS

| | | |
|---|---|---|
| WO | WO2004058497 A1 | 7/2004 |
| WO | WO2006007200 A2 | 1/2006 |
| WO | WO2006071306 A1 | 7/2006 |
| WO | WO2006131950 A1 | 12/2006 |

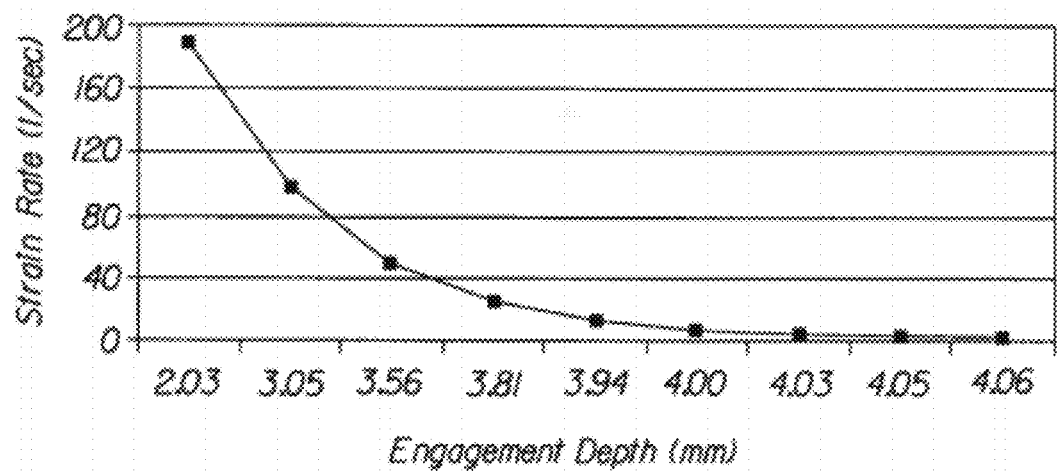
Fig. 19
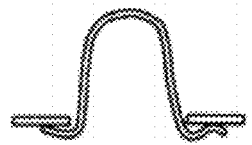 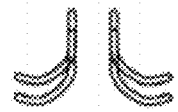
Fig. 20A        Fig. 20B

METHOD AND APPARATUS FOR INCREMENTALLY STRETCHING A WEB

CROSS REFERENCE TO RELATED APPLICATION

This application is a divisional of U.S. patent application Ser. No. 12/045,969, filed Mar. 11, 2008, now U.S. Pat. No. 8,021,591 which is a continuation-in-part of application Ser. No. 11/717,557, filed Mar. 13, 2007 now abandoned.

FIELD OF THE INVENTION

A method and apparatus is provided for incrementally stretching a web. In particular, the method and apparatus is directed to controlled incremental stretching of a web at a low rate of strain resulting in improved web properties with minimal web damage.

BACKGROUND OF THE INVENTION

Nonwoven fabrics or webs, alone or as a laminate with other nonwovens or films, constitute all or part of numerous commercial products including disposable absorbent products such as adult incontinence products, sanitary napkins, disposable diapers, and training pants. Other commercial products include wipers, protective garments, and surgical gowns. Nonwoven fabrics have been used in the manufacture of such personal care products because it is possible to produce them with desirable cloth-like aesthetics at a low cost. The elastic properties of some nonwoven fabrics have allowed them to be used in form-fitting garments, and their flexibility enables the wearer to move in a normal, unrestricted manner.

Nonwoven fabrics or webs have a physical structure of individual fibers, strands or threads which are interlaid, but not in a regular, identifiable manner as in a knitted or woven fabric. The fibers may be continuous or discontinuous, and are frequently produced from thermoplastic polymer or copolymer resins from the general classes of polyolefins, polyesters and polyamides, as well as numerous other polymers. Fibers from blends of polymers or conjugate multicomponent fibers may also be employed. Methods and apparatus for forming fibers and producing a nonwoven web from synthetic fibers include meltblowing, spunbonding and carding. Physical properties such as strength, softness, elasticity, absorbency, flexibility and breathability are readily controlled in making nonwovens. However, certain properties must often be balanced against others. An example would be an attempt to lower costs by decreasing fabric basis weight while maintaining reasonable strength.

Films are another common component in many commercial products such as trash bags, diaper backsheets, packaging materials, elastic components, and apertured films such as topsheets. Other films are used as a breathable barrier layer for increased comfort. Breathable microporous films comprise filled films which include a thermoplastic polymer and filler. These and other films can be formed by any one of a variety of film forming processes known in the art including extruding, casting or blowing.

It is widely recognized that properties relating to strength, softness, stretch and/or extensibility of nonwoven fabrics and films are desirable for many applications. Softness can be improved by various mechanical steps including stretching of the nonwoven to break secondary bonds that tend to stiffen the material. Stretch or extensibility of the material can also be improved by stretching the web as it passes between activation rolls. Activation rolls have teeth and grooves which intermesh at a nip having an activation path length. Typical roll on roll activation tooling have an activation path length in the range of 0.5 inches or less. Commercial film, nonwoven, and product making processes are often desired to be run at the highest possible line speeds to create lower manufacturing costs. As a result, stretching resulting from the activation can occur at high rates of strain, which depending on the nature of the material, can result in damage to the final product.

With the ever increasing drive to reduce material cost, the industry is continuously looking for ways of reducing basis weight or substituting lower cost materials in consumer products while maintaining desirable properties such as strength, softness, elasticity, absorbency, flexibility and breathability. Materials typically lacking such properties can attain them through activation; however, some materials including some polypropylenes, polyethylenes, polyesters, and cellulosics are unable to withstand the high rate of strain required for commercial production. Therefore, the need exists for processes and equipment capable of performing mechanical activation on low cost materials at relatively high processing line speeds.

SUMMARY OF THE INVENTION

The present invention provides a method and apparatus which uses activation members for incrementally stretching a web at a relatively low strain rate. The activation members include an activation belt and a single activation member wherein the activation belt and single activation member comprise a plurality of teeth and grooves that complement and engage one another at a depth of engagement in a deformation zone. The depth of engagement is capable of increasing linearly over the deformation zone. In exemplary embodiments the deformation zone can be controlled to increase linearly over at least a portion of the deformation zone such that a web interposed between the activation belt and the single activation member in the deformation zone is incrementally stretched at a low rate of strain. The activation members are capable of forming deformation zones having a relatively longer path length while occupying limited space in a machine direction.

In one embodiment, the single activation member is a single activation roll having a plurality of circumferential teeth and grooves. In this embodiment, the deformation zone is formed between a first section of a plurality of teeth and grooves of the activation belt and an arcuate section of a plurality of circumferential teeth and grooves of the single activation roll which engage one another at a depth of engagement. A series of back-up rollers are arranged along the deformation zone forcing the first section of the plurality of teeth and grooves of the activation belt into engagement with the arcuate section of the plurality of circumferential teeth and grooves of the single activation roll and controlling the depth of engagement therebetween. In an alternate embodiment, at least two of the back-up rollers are independently adjustable to control the depth of engagement. In another embodiment, the back-up rollers are arranged to control the depth of engagement to increase linearly over at least a portion of the deformation zone, such that a web interposed between the activation belt and the single activation roll in the deformation zone is incrementally stretched at a constant rate of strain.

In another embodiment, the activation belt is a first activation belt and the single activation member is a second activation belt comprising a plurality of teeth and grooves that complement the plurality of teeth and grooves of the first activation belt. A deformation zone having a path length is formed between a first section of a plurality of teeth and grooves of the first activation belt and a second section of a plurality of teeth and grooves of the second activation belt. For this embodiment, a first set of rollers supporting the first section of the first activation belt and a second set of rollers supporting the second section of the second activation belt are arranged along the path length of the deformation zone to force the plurality of teeth and grooves of the first activation belt into engagement with the plurality of teeth and grooves of the second activation belt and to control the depth of engagement therebetween. In one embodiment, at least two rollers disposed at different locations along the path length are independently adjustable to change the depth of engagement in the deformation zone. In another embodiment the first set of rollers and the second set of rollers are arranged to provide a linear increase in the depth of engagement over at least a portion of the deformation zone such that a web interposed between the first activation belt and the second activation belt in the deformation zone is incrementally stretched at a constant rate of strain.

BRIEF DESCRIPTION OF THE DRAWINGS

FIG. 19 is a graph showing strain rate varying from high to low in the deformation zone during micro-SELF activation.

FIG. 20A is a tuft formed in a laminate via micro-SELF activation according to the strain rate depicted by the graph in FIG. 19.

FIG. 20B is a tuft formed during micro-SELF activation using high strain rate activation rolls.

DETAILED DESCRIPTION OF THE INVENTION

Definitions

Figure 1A:
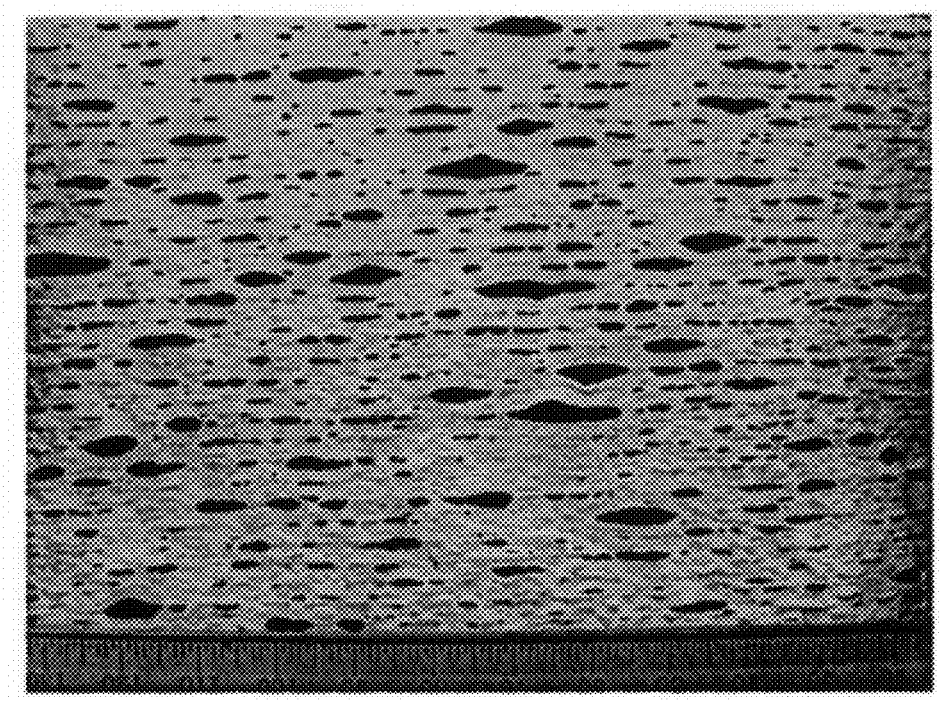
FIG. 1A is photograph of a film activated via high strain rate activation.

As used herein and in the claims, the term "comprising" is inclusive or open-ended and does not exclude additional unrecited elements, compositional components, or method steps.

As used herein, "machine direction" means the path that material, such as a web, follows through a manufacturing process.

As used herein "cross direction" means the path that is perpendicular to the machine direction in the plane of the web.

As used herein the term "activation" means any process by which tensile strain produced by intermeshing teeth and grooves causes intermediate web sections to stretch or extend. Such processes have been found useful in the production of many articles including breathable films, stretch composites, apertured materials and textured materials. For nonwoven webs, the stretching can cause fiber reorientation, a reduction in basis weight, and/or controlled fiber destruction in the intermediate web sections. For example, a common activation method is the process known in the art as ring rolling.

As used herein the term "activation member" means a device including teeth and grooves for performing activation.

As used herein the term "deformation zone" means an area where teeth and grooves of opposing activation members intermesh causing activation.

As used herein the term "path length" means the length of the deformation zone formed by intermeshing teeth and grooves of opposing activation members.

As used herein "depth of engagement" means the extent to which intermeshing teeth and grooves of opposing activation members extend into one another.

As used herein, the term "nonwoven web" refers to a web having a structure of individual fibers or threads which are interlaid, but not in a repeating pattern as in a woven or knitted fabric, which do not typically have randomly oriented fibers. Nonwoven webs or fabrics have been formed from many processes, such as, for example, meltblowing processes, spunbonding processes, hydroentangling, and bonded carded web processes, including carded thermal bonding. The basis weight of nonwoven fabrics is usually expressed in grams per square meter (gsm). The basis weight of the laminate web is the combined basis weight of the constituent layers and any other added components. Fiber diameters are usually expressed in microns; fiber size can also be expressed in denier, which is a unit of weight per length of fiber. The basis weight of laminate webs suitable for use in the present invention can range from 6 gsm to 400 gsm, depending on the ultimate use of the web. For use as a hand towel, for example, both a first web and a second web can be a nonwoven web having a basis weight of between 18 gsm and 500 gsm.

The constituent fibers of a nonwoven web can be polymer fibers, and can be monocomponent, bicomponent, and/or biconstituent, non-round (e.g., capillary channel fibers), and can have major cross-sectional dimensions (e.g., diameter for round fibers) ranging from 0.1-500 microns. The constituent fibers of the nonwoven web may also be a mixture of different fiber types, differing in such features as chemistry (e.g. PE and PP), components (mono- and bi-), denier (micro denier and >20 denier), shape (i.e. capillary and round) and the like. The constituent fibers can range from about 0.1 denier to about 100 denier.

As used herein, "spunbond fibers" refers to relatively small diameter fibers which are formed by extruding molten thermoplastic material as filaments from a plurality of fine, usually circular capillaries of a spinneret with the diameter of the extruded filaments then being rapidly reduced. Spunbond fibers are generally not tacky when they are deposited on a collecting surface. Spunbond fibers are generally continuous and have average diameters (from a sample of at least 10) larger than 7 microns, and more particularly, between about 10 and 40 microns.

As used herein, the term "meltblowing" refers to a process in which fibers are formed by extruding a molten thermoplastic material through a plurality of fine, usually circular, die capillaries as molten threads or filaments into converging high velocity, usually heated, gas (for example air) streams which attenuate the filaments of molten thermoplastic material to reduce their diameter, which may be to microfiber diameter. Thereafter, the meltblown fibers are carried by the high velocity gas stream and are deposited on a collecting surface, often while still tacky, to form a web of randomly dispersed meltblown fibers. Meltblown fibers are microfibers which may be continuous or discontinuous and are generally smaller than 10 microns in average diameter.

As used herein, the term "polymer" generally includes, but is not limited to, homopolymers, copolymers, such as for example, block, graft, random and alternating copolymers, terpolymers, etc., and blends and modifications thereof. In addition, unless otherwise specifically limited, the term "polymer" includes all possible geometric configurations of the material. The configurations include, but are not limited to, isotactic, atactic, syndiotactic, and random symmetries.

As used herein, the term "monocomponent" fiber refers to a fiber formed from one or more extruders using only one polymer. This is not meant to exclude fibers formed from one polymer to which small amounts of additives have been added for coloration, antistatic properties, lubrication, hydrophilicity, etc. These additives, for example titanium dioxide for coloration, are generally present in an amount less than about 5 weight percent and more typically about 2 weight percent.

As used herein, the term "bicomponent fibers" refers to fibers which have been formed from at least two different polymers extruded from separate extruders but spun together to form one fiber. Bicomponent fibers are also sometimes referred to as conjugate fibers or multicomponent fibers. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement.

As used herein, the term "biconstituent fibers" refers to fibers which have been formed from at least two polymers extruded from the same extruder as a blend. Biconstituent fibers do not have the various polymer components arranged in relatively constantly positioned distinct zones across the cross sectional area of the fiber and the various polymers are usually not continuous along the entire length of the fiber, instead usually forming fibers which start and end at random. Biconstituent fibers are sometimes also referred to as multiconstituent fibers.

As used herein, the term "non-round fibers" describes fibers having a non-round cross-section, and include "shaped fibers" and "capillary channel fibers." Such fibers can be solid or hollow, and they can be tri-lobal, delta-shaped, and are preferably fibers having capillary channels on their outer surfaces. The capillary channels can be of various cross-sectional shapes such as "U-shaped", "H-shaped", "C-shaped" and "V-shaped". One preferred capillary channel fiber is T-401, designated as 4DG fiber available from Fiber Innovation Technologies, Johnson City, Tenn. T-401 fiber is a polyethylene terephthalate (PET polyester).

Regarding all numerical ranges disclosed herein, it should be understood that every maximum numerical limitation given throughout this specification includes every lower numerical limitation, as if such lower numerical limitations were expressly written herein. In addition, every minimum numerical limitation given throughout this specification will include every higher numerical limitation, as if such higher numerical limitations were expressly written herein. Further, every numerical range given throughout this specification will include every narrower numerical range that falls within such broader numerical range and will also encompass each individual number within the numerical range, as if such narrower numerical ranges and individual numbers were all expressly written herein.

Figure 1B:
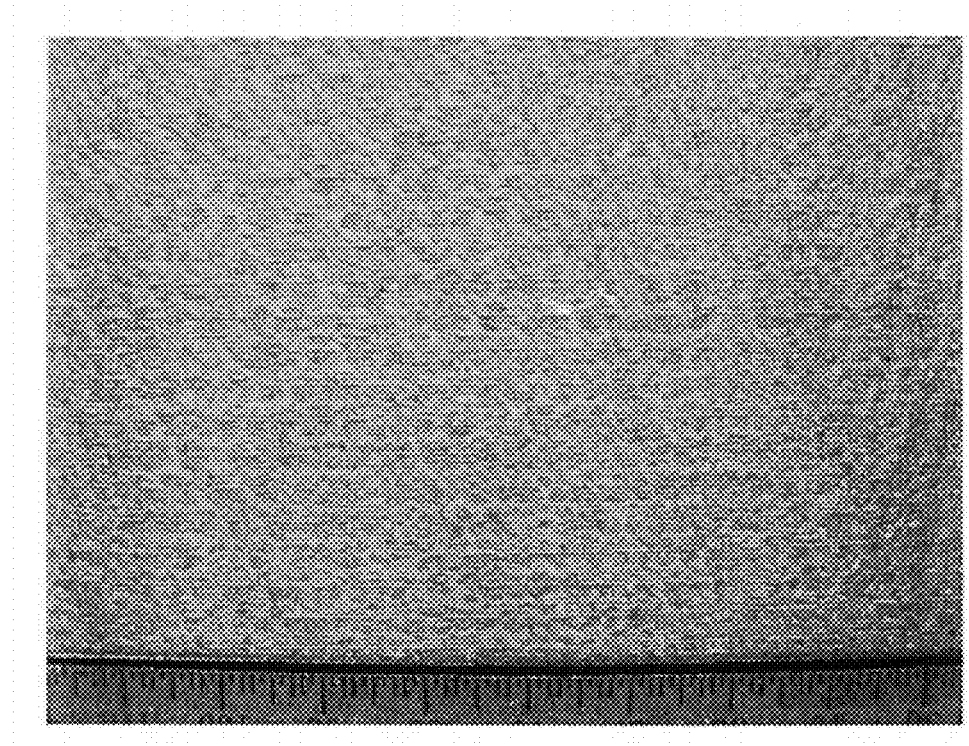
FIG. 1B is a photograph of a film activated via low strain rate activation.

Materials such as polypropylenes, polyethylenes, polyesters, and cellulosics are typically damaged or even shredded when subjected to high strain rates during activation. For instance, FIG. 1A illustrates a Clopay 15 gsm polypropylene film that has been activated at 100 feet per minute using activation rolls. As shown the film exhibits noticeable signs of damage evidenced by the presence of holes in the film. The present invention provides an apparatus and method for deforming web materials by incrementally stretching a web via activation causing minimal, if any, destruction of the web. The method and apparatus include opposing activation members comprising a plurality of teeth and grooves that complement and engage one another at a depth of engagement in a deformation zone having a path length. The path length is sized and the depth of engagement is controlled such that a web interposed between the activation members in the deformation zone is incrementally stretched at a relatively low rate of strain with respect to known roll on roll activation tooling. FIG. 1B illustrates the Clopay 15 gsm polypropylene film shown in FIG. 1A, activated according to the low strain rate method of the present invention at 500 feet per minute. As shown, even at higher web speed, the web experienced no visible damage as compared to the web in FIG. 1A. Web materials suitable for activation according to the present invention include, but are not limited to polymeric film materials, nonwoven web materials, and laminates of nonwoven webs with other nonwoven webs and/or polymeric film materials. Other web materials suitable for activation include paper, cellulose, wovens, natural (sustainable) materials, metallic foils, foams, elastics, absorbent batting and the like.

The low strain rate activation according to the present invention will be described with reference to the following figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and equivalents.

Figure 2:
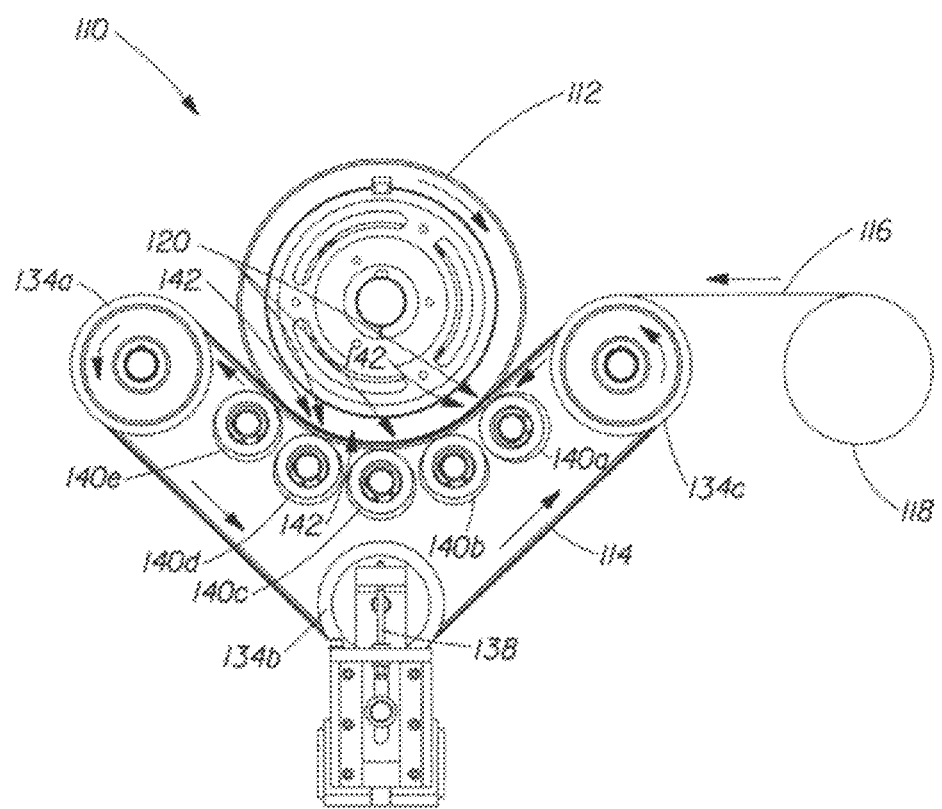
FIG. 2 is a plan view of an apparatus for incrementally stretching a web according to the present invention comprising a single activation roll and an activation belt.

FIG. 2 illustrates an exemplary apparatus for incrementally stretching a web via activation according to the present invention. Apparatus 110 comprises a single activation member in the form of a single activation roll 112 and an activation belt 114. The single activation roll 112 comprises a cylindrical roll and the activation belt 114 comprises a continuous endless band. As shown in FIG. 2, web 116 is withdrawn from a supply roll 118 and travels in a direction indicated by the arrow. Web 116 is fed to deformation zone 120 formed between the single activation roll 112 and the activation belt 114 where the web is incrementally stretched as it passes therebetween.

Figure 3:
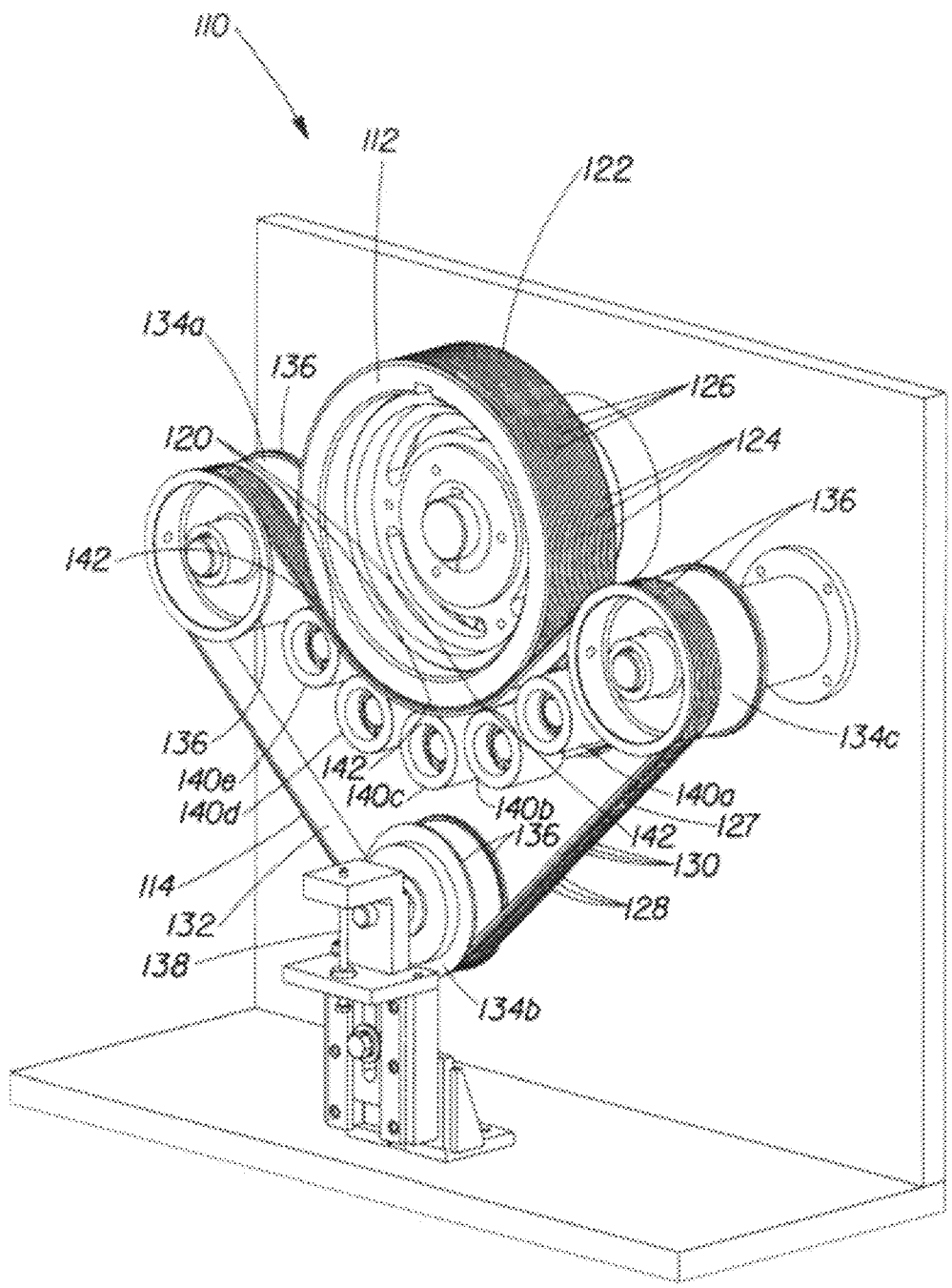
FIG. 3 is a perspective view of the apparatus shown in FIG. 2.

The relative positions of the single activation roll 112 and activation belt 114 are shown in a perspective view in FIG. 3. The single activation roll 112 is rotatably mounted on a power driven rotatable shaft. The single activation roll 112 comprises a cylindrical outer surface 122 including a plurality of axially-spaced, side-by-side, circumferentially-extending equally-configured teeth 124 formed therein. The teeth 124 can be in the form of thin fins of substantially rectangular cross section, or they can have a triangular or an inverted V-shape when viewed in cross section. If they are triangular, the vertices of the teeth 124 are outermost with respect to the cylindrical outer surface 122 of the single activation roll 112. In any configuration, the outermost tips of the teeth 124 are preferably rounded to avoid cuts or tears in the web materials. The spaces between adjacent teeth define recessed, circumferentially-extending, equally configured grooves 126. The grooves 126 can be of substantially rectangular cross section when the teeth are of substantially rectangular cross section, and they can be of inverted triangular cross section when the teeth are of triangular cross section.

The activation belt 114 is disposed contiguous with the single activation roll 112. The activation belt 114 includes an outer surface 127 comprising a plurality of axially-spaced, side-by-side, longitudinally-extending equally-configured teeth 128 and grooves 130 which complement the plurality of circumferential teeth 124 and grooves 126 of the single activation roll 112. Thus, the activation belt 114 and the single activation roll 112 include a plurality of spaced teeth and alternating grooves between each pair of adjacent teeth. The teeth and the grooves need not each be of the same shape as long as there is sufficient clearance to permit the material that passes between the interengaged activation members to be received within the respective grooves and to be locally stretched, as will be explained further below.

Figure 6:
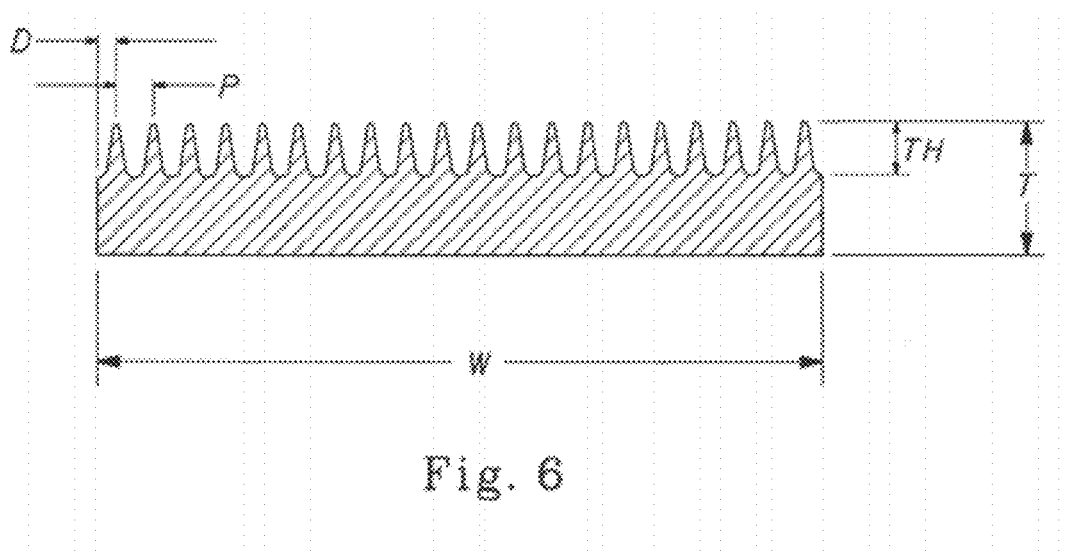
FIG. 6 is a cross sectional view of an activation belt used in the apparatus shown in FIGS. 2-5B.

The activation belt 114 can include urethane-based material in the durometer range of 80 A-85 D, ground to a belt profile specification shown in FIG. 6 where the activation belt has a width W of about 1.200 inches (30.48 mm), a thickness T of about 0.215 inches (5.461 mm), a tooth height TH of about 0.090 inches (2.286 mm) and a tooth pitch P of about 0.060 inches (1.524 mm). In the embodiment shown in FIGS. 2 and 3, two or more belts arranged in parallel can be used depending on the cross machine direction length of the web that is incrementally stretched. For this reason, the distance D between the edges of the belt shown in FIG. 6 and the first tooth inside each edge is half the pitch or 0.030 inches (0.762 mm) Such belts are supplied by F.N. Sheppard & Co. of 1261 Jamike Drive Erlanger, Ky. 41018.

The activation belt 114 includes an inner surface 132 which is fitted on three pulleys, a first pulley 134a, a second pulley 134b, and a third pulley 134c. The three pulleys are disposed near the single activation roll 112 in a triangular arrangement. The first pulley 134a is powered to drive the activation belt 114 along the three pulleys 134a, 134b and 134c. The second and the third pulleys 134b and 134c are idlers guiding the activation belt 114 along a defined path which engages the teeth 128 and grooves 130 of the activation belt 114 with the circumferential teeth 124 and grooves 126 of the single activation roll 112. The corresponding teeth 128 and grooves 130 of the activation belt 114 and the single activation roll 112 engage along an arcuate section 142 of the single activation roll 112 forming the deformation zone 120 where, as previously described, the web 116 is incrementally stretched as it is conveyed therebetween. The first, second, and third pulleys 134a, 134b, and 134c include shoulders 136 for maintaining axial alignment of the activation belt 114.

The second pulley 134b includes an adjustment 138 to vary the tension on the activation belt 114. Belt tension can be adjusted wherein a web 116 conveyed between the single activation roll 112 and the activation belt 114 causes the activation belt 114 to deflect away from the single activation roll 112 thereby preventing the plurality of teeth 128 and grooves 130 of the activation belt 114 from engaging the circumferential teeth 124 and grooves 126 of the single activation roll 112. The activation belt 114 tension can vary depending on the material of the web 116.

In another embodiment (not shown), instead of three pulleys, the apparatus could include two pulleys disposed in the locations of pulleys 134a and 134c where each pulley is large enough in diameter and positioned to eliminate the need of the third tensioning pulley 134b. Alternatively, additional pulleys or idlers can be added and disposed to support the belt in an elliptical or circular arrangement in order to increase belt life by reducing belt flex during operation.

The teeth 128 and grooves 130 of the activation belt 114 are forced into engagement with the circumferential teeth 124 and grooves 126 of the single activation roll 112, deforming the web 116 therebetween, by a series of back-up rollers 140 (a-e) arranged along an arcuate section 142 of the outer surface 122 of the single activation roll 112 with the activation belt 114 passing therebetween. The back-up rollers 140(a-e) form the deformation zone 120 where the activation belt 114 is forced into engagement with the single activation roll 112. The back-up rollers 140(a-e) can be adjustable to vary the radial distance between the back-up rollers and the outer surface 122 of the single activation roll 112. The radial adjustment controls the depth of engagement between the teeth 128 and grooves 130 of the activation belt 114 and the circumferential teeth 124 and grooves 126 of the single activation roll 112.

The back-up rollers 140(a-e) can be arranged along the deformation zone 120 and independently adjusted to control the depth of engagement between the activation belt 114 and the single activation roll 112 at each back-up roller 140(a-e) to incrementally stretch the web 116 conveyed through the deformation zone 120. In an exemplary embodiment, the series of back-up rollers 140(a-e) can be adjusted to increase the depth of engagement linearly along the deformation zone 120 resulting in a constant low rate of strain induced on the deforming web. For this embodiment, the radial distance between the first back-up roller 140a in the series and the outer surface 122 of the single activation roll 112 is adjusted to a maximum distance where as the radial distance between the last back-up roller 140e in the series and the outer surface 122 of the single activation roll 112 is adjusted to a minimum distance. The radial distance between the outer surface 122 of the single activation roll 112 and the back-up rollers 140(b-d) disposed between the first and last roller 140a and 140e in the series are adjusted to decrease an amount for each succeeding roller from the first back-up roller to the last back-up roller resulting in a smooth continuous increase in depth of engagement.

The number of back-up rollers used depends on the path length of the deformation zone 120 and the size of the individual rollers. Since the activation belt 114 can deflect between the individual back-up rollers 140(a-e) during deformation of the web, it may be desirable to minimize the diameter of the back-up rollers 140(a-e) to minimize the corresponding distance between rollers. In an alternate embodiment (not shown), a back-up belt can be added to the back-up rollers to further reduce activation belt deflection between the individual back-up rollers. For this embodiment, a back-up belt can be assembled on the back-up rollers and work in conjunction with the back-up rollers to control the depth of engagement between the activation belt and the single activation roll while reducing the deflection of the activation belt between back-up rollers.

In order to prevent the web from slipping in the cross machine direction and corrugating during activation, the web can be prewrapped on the single activation roll prior to the deformation zone. Such embodiment can include a nip roll (not shown) disposed adjacent to the single activation roll prior to the deformation zone to add tension to the web during activation.

In another embodiment (not shown), the activation belt can include a laminate structure comprised of a grooved upper layer and a relatively stiffer backing layer to minimize the deflection of the activation belt. In alternate embodiment, the activation belt may consist of flexibly joined rigid links, continuously extruded shaped belts, spun-cast belts, molded belts, and other known belt technologies. Other means of supporting the activation belt include dead plates, reinforcing wires, chains, conveyors and the like.

The activation belt can also include designs to increase durability and longevity. Such designs include increasing the coefficient of friction of the inner diameter of the belt to reduce slippage between the belt and pulleys such that tension ordinarily placed on the belt to control slippage can be reduced. Alternatively, the pulleys can be replaced with gears and the inner diameter of the belt can include mating gears. Other design for improving belt durability and longevity include varying the durometer through the thickness of the belt so that the inner diameter of the belt is soft to enhance flexibility while the teeth in the outer diameter are hard providing robustness during activation. Another alternative belt design can include producing belts where the teeth are under an initial tension prior to assembly which is enhanced at assembly. The pretensioned teeth can be produced by forming the activation teeth on the inner diameter of the belt during manufacture and turning the belt inside out prior to assembly so that the teeth are opposite the belt surface mating with the pulleys. Since the teeth are normally loaded in compression in the deformation zone, designing the belt with an initial tensile load can increase the tension such that teeth approach a neutral load in the deformation zone instead of a negative compressive load.

The path length of the deformation zone 120 is set to accommodate web speed which is the speed the web flows in the machine direction during processing. The path length can be increased with increasing line speed in order to maintain a relatively lower rate of strain. Potential damage to the web can minimized in this manner without reducing line speed, increasing apparatus size and/or decreasing engagement. Although the path length of the deformation zone 120 for the activation belt and single activation roll apparatus 110 can vary, the path length is limited by the size of the single activation roll 112. For the present invention, the size of the single activation roll 112 can vary from a roll having an outside diameter ranging from about 3.0 inches (0.076 meters) to about 96.0 inches (2.438 meters) and the corresponding path length of the deformation zone 120 can vary from about 0.5 inches (0.013 meters) to about 200 inches (5.08 meters).

Depending on the type of material to be activated and process requirements such as line speed, it may be desirable to maximize the path length of the deformation zone 120. Such requirements can be achieved by sizing the activation roll 112 and providing a number of back-up rollers 140 necessary to accomplish the desired path length. However, meeting such requirements may require a nonstandard roll size which can be costly or impractical for a manufacturing line. For instance, space available on web manufacturing lines for devices such as the single activation roller and activation belt apparatus 110 previously described can be limited. In fact it is desirable for such apparatus to occupy a space on the line having a length in the machine direction which is less than about 39 inches (1 meter). Such space requirements can limit the size of the single activation roll 112 to 24 inches (0.61 meters) resulting in maximum deformation zone 120 path length of about 50 inches (1.27 meters). Therefore, it is desirable for the deformation zone 120 path length of the activation belt and single roller activation apparatus 110 to range from about 0.5 inches (0.01 meters) to about 50 inches (1.27 meters) and from about 10 inches (0.25 meters) to about 50 inches (1.27 meters). Applications requiring longer path lengths can be accomplished using alternative embodiments of the present invention such as the dual activation belt apparatus 210 illustrated in FIG. 4.

Figure 4:
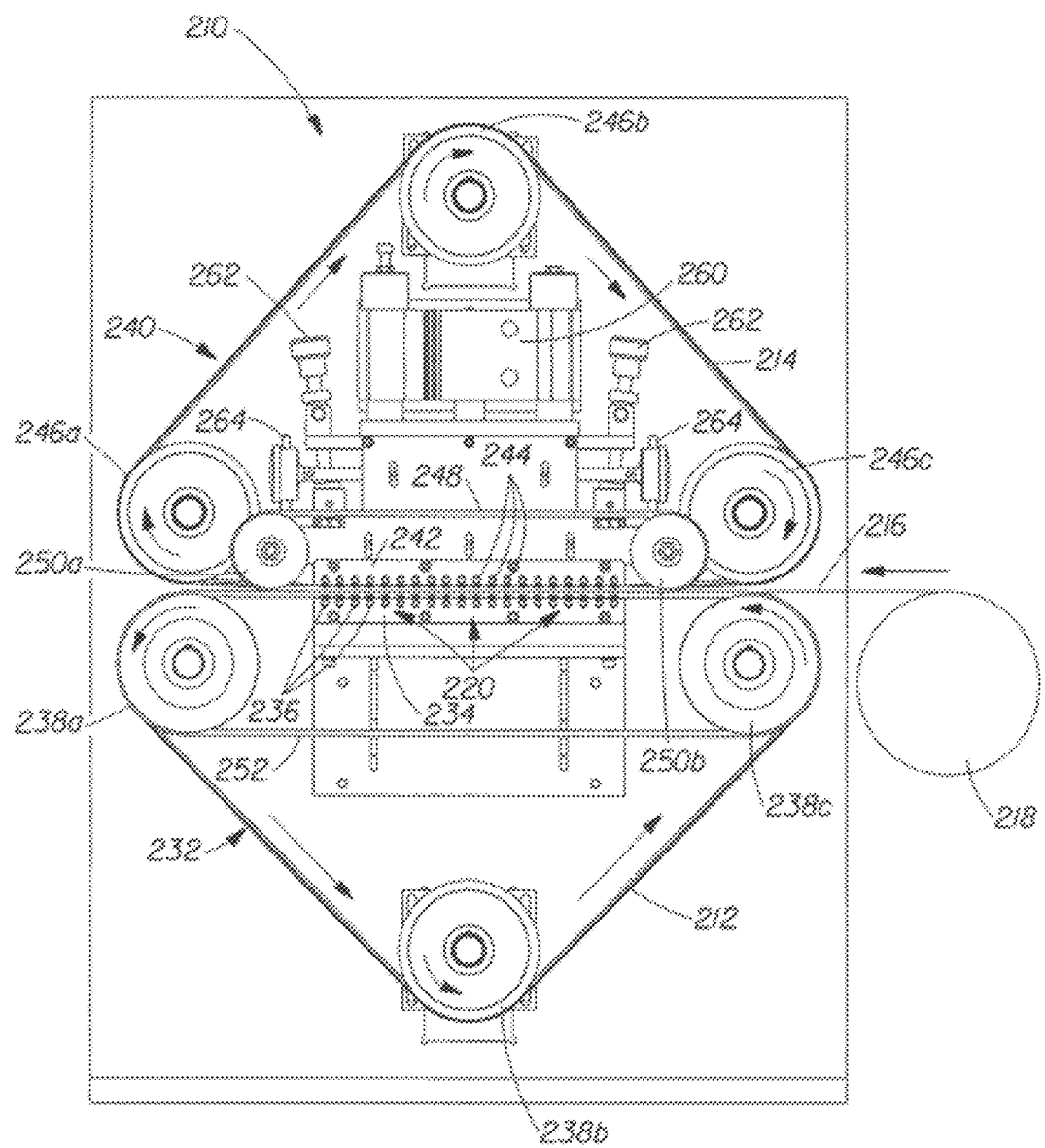
FIG. 4 is a plan view of an apparatus for incrementally stretching a web according to the present invention comprising a first activation belt and a second activation belt.

The dual activation belt apparatus 210 includes an activation belt in the form of a first activation belt 212 and a single activation member in the form of a second activation belt 214. The first and second activation belts 212, 214 comprise continuous bands. As shown in FIG. 4, web 216 is withdrawn from a supply roll 218 and travels in a direction indicated by the arrow. Web 216 is fed to deformation zone 220 formed by the first activation belt 212 and the second activation belt 214 where the web is incrementally stretched as it passes therebetween.

Figure 5A:
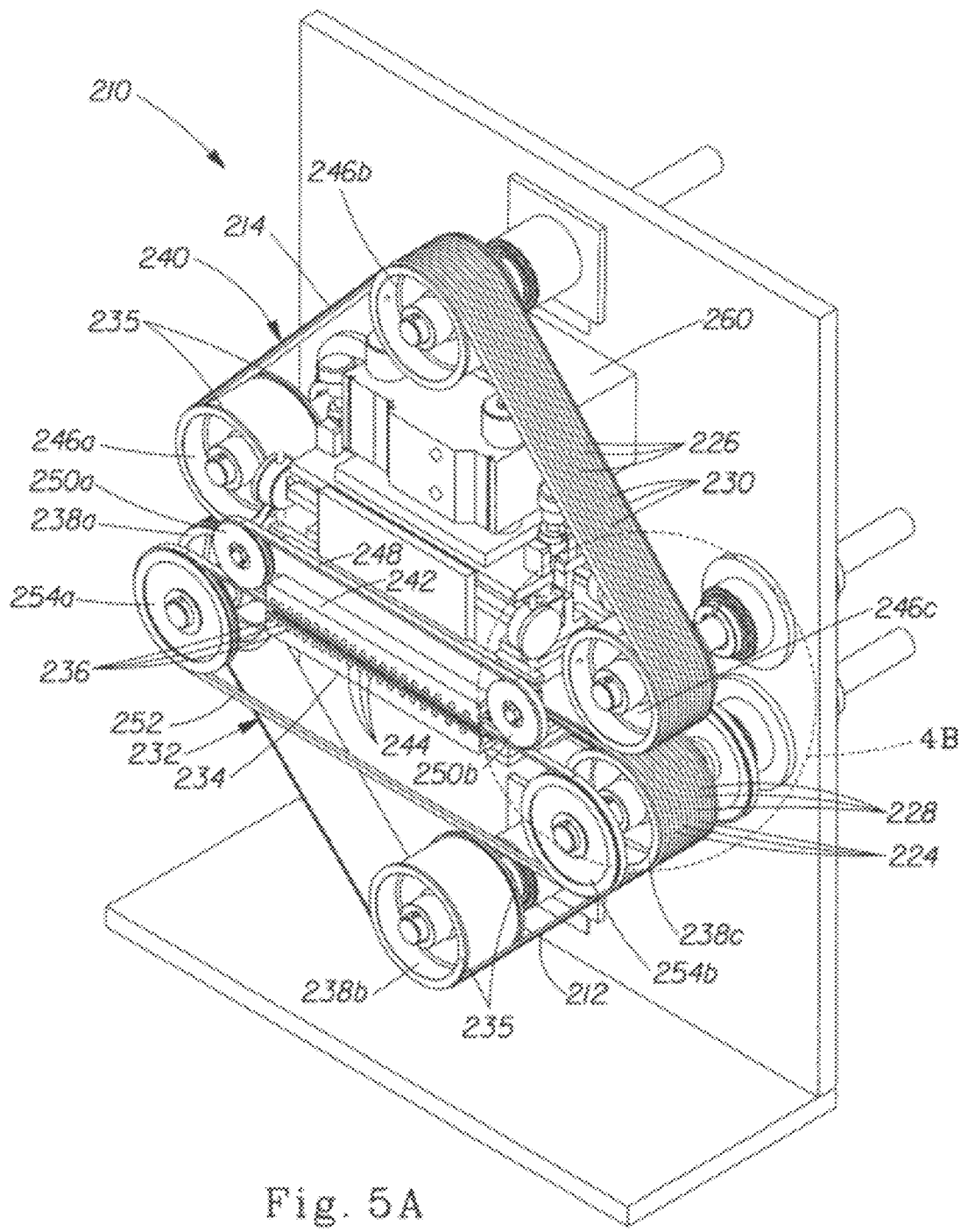
FIG. 5A is a perspective view of the apparatus shown in FIG. 4.
Figure 5B:
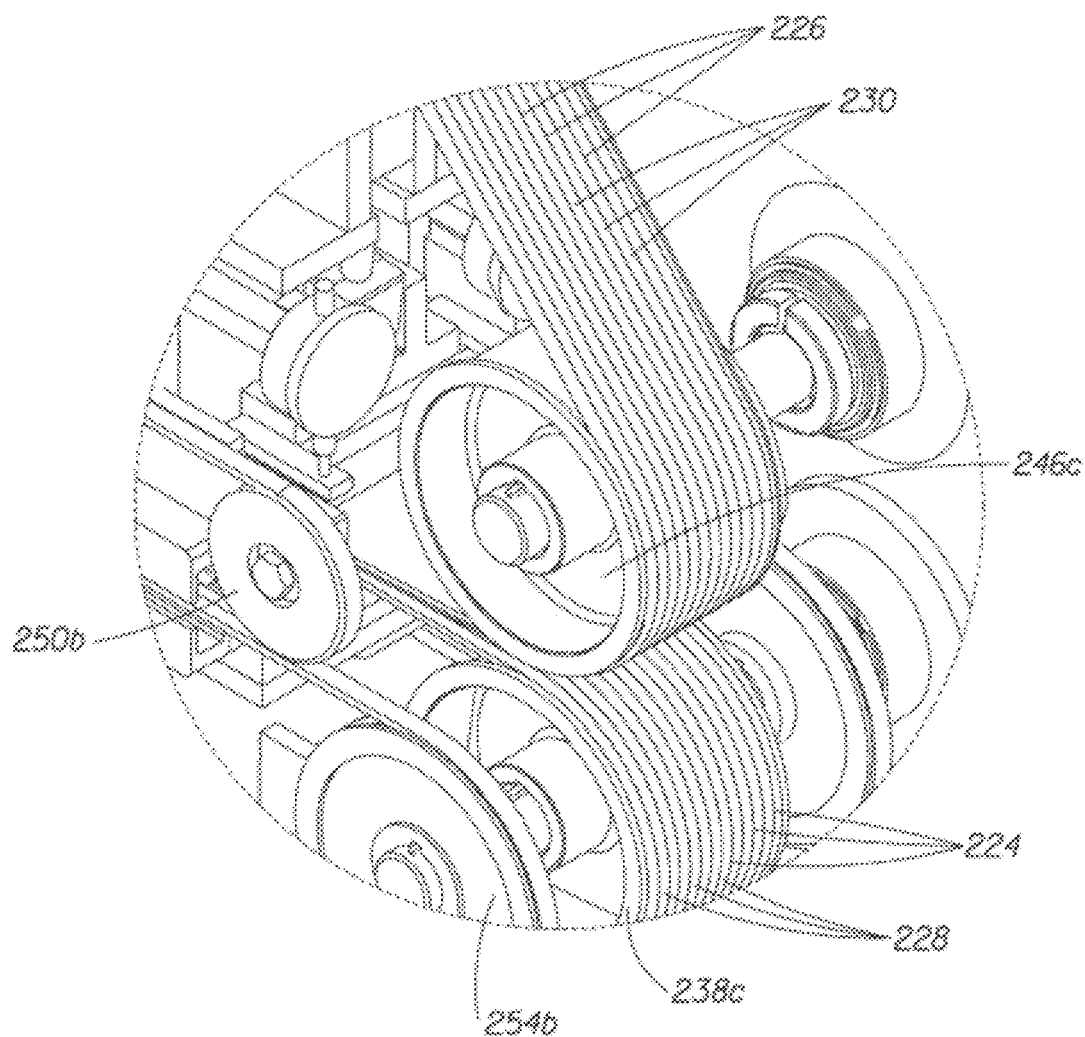
FIG. 5B is a close up view of a portion of the apparatus shown in FIG. 5A showing the teeth and grooves of the first and second activation belts.

The relative positions of the first activation belt 212 and second activation belt 214 are shown in a perspective view in FIG. 5A. The first and second activation belts 212, 214 include a plurality of axially-spaced, side-by-side, longitudinally-extending, equally-configured teeth 224, 226 shown in FIG. 5B. Teeth 224, 226 can be in the form of thin fins of substantially rectangular cross section, or they can have a triangular or an inverted V-shape when viewed in cross section. If they are triangular, the vertices of teeth are outermost with respect to the outer surface of the belts. The spaces between adjacent teeth 224, 226 shown in FIG. 5B define recessed, circumferentially-extending, equally configured grooves 228, 230. The grooves 228, 230 can be of substantially rectangular cross section when the teeth 224, 226 are of substantially rectangular cross section, and they can be of inverted triangular cross section when the teeth 224, 226 are of triangular cross section. Thus, the first and second activation belts 212, 214 include a plurality of spaced teeth 224, 226 and alternating grooves 228, 230 between each pair of adjacent teeth.

As shown in FIGS. 4 and 5A, the dual belt apparatus 210 includes a lower carriage 232 supporting the first activation belt 212 and an upper carriage 240 supporting the second activation belt 214. Lower carriage 232 includes a lower idler bed 234 and upper carriage 240 includes upper idler bed 242. The lower idler bed 234 includes a lower or first set of rollers 236 which support the first activation belt 212 and the upper idler bed 242 includes an upper or second set of rollers 244 which support the second activation belt 214. Rollers 236 and 244 support the first and second activation belts 212, 214 in a parallel arrangement and force the teeth 224, 226 and grooves 228, 230 into engagement in the deformation zone 220. Rollers 236 and 244 can be independently adjusted to control the depth of engagement between teeth 224, 226 and grooves 228, 230 of the first and second activation belts 212, 214. Other means of supporting the activation belts include dead plates, reinforcing wires, chains, conveyors and the like.

The lower carriage 232 includes three pulleys, a first pulley 238a, a second pulley 238b and a third pulley 238c disposed in a triangular arrangement and supporting the first activation belt 212. The first pulley 238a is rotatably mounted on power driven shaft and the second and the third pulleys 238b, 238c are rotatably mounted on idler shafts. The three pulleys guide the first activation belt 212 along a defined path which passes over rollers 236 and include shoulders 235 for maintaining axial alignment of the first activation belt 212. The first activation belt 212 is loaded with sufficient tension to drive the belt over the pulleys and lower set of rollers without slipping.

Similar to the lower carriage 232, the upper carriage 240 includes three pulleys, a fourth pulley 246a, a fifth pulley 246b and a sixth pulley 246c disposed in a triangular arrangement opposite the lower carriage 232. The fourth pulley 246a is rotatably mounted on power driven shaft and fifth and sixth pulleys 246b, 246c are rotatably mounted on idler shafts. The fourth, fifth and sixth pulleys 246(a-c) guide the second activation belt 214 along a defined path which passes over the upper set of rollers 244 and include shoulders 235 for maintaining axial alignment of the second activation belt 214. Like the first activation belt 212, the second activation belt 214 is loaded with sufficient tension to drive the belt over the pulleys and upper set of rollers 244 without slipping.

In another embodiment (not shown), the activation belts can include laminate structures comprised of a grooved upper layer and a relatively stiffer backing layer to minimize the deflection of the activation belts. In alternate embodiment, the activation belts may consist of flexibly joined rigid links, continuously extruded shaped belts, spun-cast belts, molded belts, and other known belt technologies. The activation belts can also include designs to increase durability and longevity previously described relative to the single activation roll 112 and activation belt 114 embodiment illustrated in FIGS. 2 and 3.

For embodiment shown in FIGS. 4 and 5A, the first and second activation belts can include urethane-based material in the durometer range of 80 A-85 D, ground to a belt profile specification shown in FIG. 6 where the activation belt has a width W of about 1.200 inches (30.48 mm), a thickness T of about 0.215 inches (5.461 mm), a tooth height TH of about 0.090 inches (2.286 mm) and a tooth pitch P of about 0.060 inches (1.524 mm). In the embodiments shown in FIGS. 4 and 5A, two or more belts can be assembled on the pulleys of the upper and lower chassis depending on the cross machine direction length of the web. For this reason, the distance D between the edges of the belt shown in FIG. 6 and the first tooth inside each edge is half the pitch or 0.030 inches (0.762 mm). Such belts are supplied by F.N. Sheppard & Co. of 1261 Jamike Drive Erlanger, Ky. 41018.

In order to secure the edges of the web 216 and prevent slippage in the cross machine direction and corresponding corrugating during deformation, the upper carriage 240 can include hold down belts 248 which span the length of the deformation zone 220 and the lower carriage can include hold down belts 252 which oppose hold down belts 248 on the upper carriage 240. Hold down belts 248 and 252 sandwich the web 216 and exert normal forces along the web edges during deformation. As shown in FIG. 5A, hold down belt 248 are assembled on opposing sides of the upper set of rollers 244 along the deformation zone 220 and hold down belts 252 are assembled on opposing sides of rollers 236 along the deformation zone 220. Hold down belts 248 are assembled on pulleys 250a, 250b mounted to the upper carriage 240 while hold down belts 252 are assembled on pulleys 254a and 254b mounted to the lower carriage 232. The pulleys supporting the hold down belts enable the belts to travel along with the web during incremental stretching. For the embodiment shown in FIGS. 3 and 4A, commercially available V-profile belting can be used as hold down belts, such as, Eagle Belting, Profile 3L, Part Number 1032030 supplied by Fenner Drives of 311 West Stiegel Street Manheim, Pa. 17545. Other means for preventing lateral slippage of the web known in the art can be used such as those disclosed in U.S. Pat. No. 5,143,679 entitled "Method for Sequentially Stretching Zero Strain Stretch Laminate Web to Impart Elasticity thereto Without Rupturing the Web," which issued on Sep. 1, 1992, to Weber, et al.

As described above, the rollers forming the lower and upper set of rollers 236, 244 supporting the first and second activation belts 212, 214 can be independently adjusted to control the depth of engagement between the teeth and grooves of the corresponding belts in the deformation zone 220. Rollers 236, 244 can be arranged such that each roller forming the lower set of rollers 236 is disposed directly opposite a roller forming the upper set of rollers 244 with a distance therebetween. The distance between each opposing pairs of rollers can be adjusted to smoothly and continuously control the depth of engagement by adjusting the vertical position of one or both rollers forming an opposing pair.

In an alternate embodiment, the depth of engagement can be controlled by varying the vertical orientation of the upper carriage 240 while maintaining the orientation of the lower carriage 232 in a fixed position. For this embodiment, the first and second sets of rollers 236, 244 are rotatably mounted on the corresponding idler beds 234, 242 in fixed orientations. The upper carriage 240 is vertically adjustable to raise and lower the upper idler bed 242 while the lower idler bed 234 remains fixed. By raising and lowering the upper idler bed 242, the distance between the lower set of rollers 236 and the upper set of rollers 244 and the corresponding depth of engagement between the teeth 224, 226 and grooves 228, 230 of the first and second activation belts 212, 214 can be adjusted. For this embodiment, the vertical position of the upper carriage 240 can be controlled by an air or hydraulic cylinder 260 which raises and lowers the upper carriage 240 when actuated. Positive mechanical stops can be positioned to set the initial orientation of the upper carriage 240 in a lowered position providing a macro level of adjustment and the initial distance between the lower set of rollers and the opposing upper set of rollers. Adjustable threaded rods 262 and depth gages 264 disposed on opposite ends of the upper idler bed 242 provide micro level adjustment of the depth of engagement between the first and second activation belts 212, 214. The adjustable threaded rods 262 can be adjusted such that the distance between the opposing rollers at the entrance of the deformation zone 220 is maximized providing minimal or zero depth of engagement between the teeth 224, 226 and grooves 228, 230 of the first and second activation belts 212, 214 and the distance between the opposing rollers at the exit of the deformation zone is minimized providing maximum depth of engagement between the teeth and grooves of the first and second activation belts 212, 214. With this arrangement the pitch of the upper idler bed 242 supporting the upper set of rollers 244 can be oriented to provide a linear increase in the depth of engagement from the entrance of the deformation zone 220 to the exit of the deformation zone 220.

The activation belt and single activation roller apparatus and the dual activation belt apparatus previously described can be used wholly or partly in place of traditional roll on roll processes. For example, the apparatus and method of the present invention can be used in combination with a thermal melt weakening step to produce apertures, as disclosed in U.S. Pat. No. 5,628,097 and U.S. Pat. No. 5,916,661, and US 2003/0028165A1. As well, the apparatus and method of the present invention can be used for making stretch portions of a topsheet as disclosed in US 2004/0127875A1, filed Dec. 18, 2002. Similarly, the apparatus and method of the present invention can be used to produce beneficially-modified topsheets as disclosed in US 2004/0131820A1, WO 2004/059061A1 and WO 2004/058118A1, and to produce apertured formed films, nonwoven webs, and laminates, as disclosed in US 2005/021753. Absorbent cores can also be modified as disclosed in WO 2004/058497A1 in which a laminate of two webs is made by processing two webs together to form a fiber-integrated composite absorbent core. In each of the processes referenced above, heat can be utilized either before or within the deformation zone. As in these prior art references, the patterns in the activation belt(s) may be continuous or discontinuous and may comprise zones differing in tooth height, tooth shape, orientation and/or pitch.

Figure 7A:
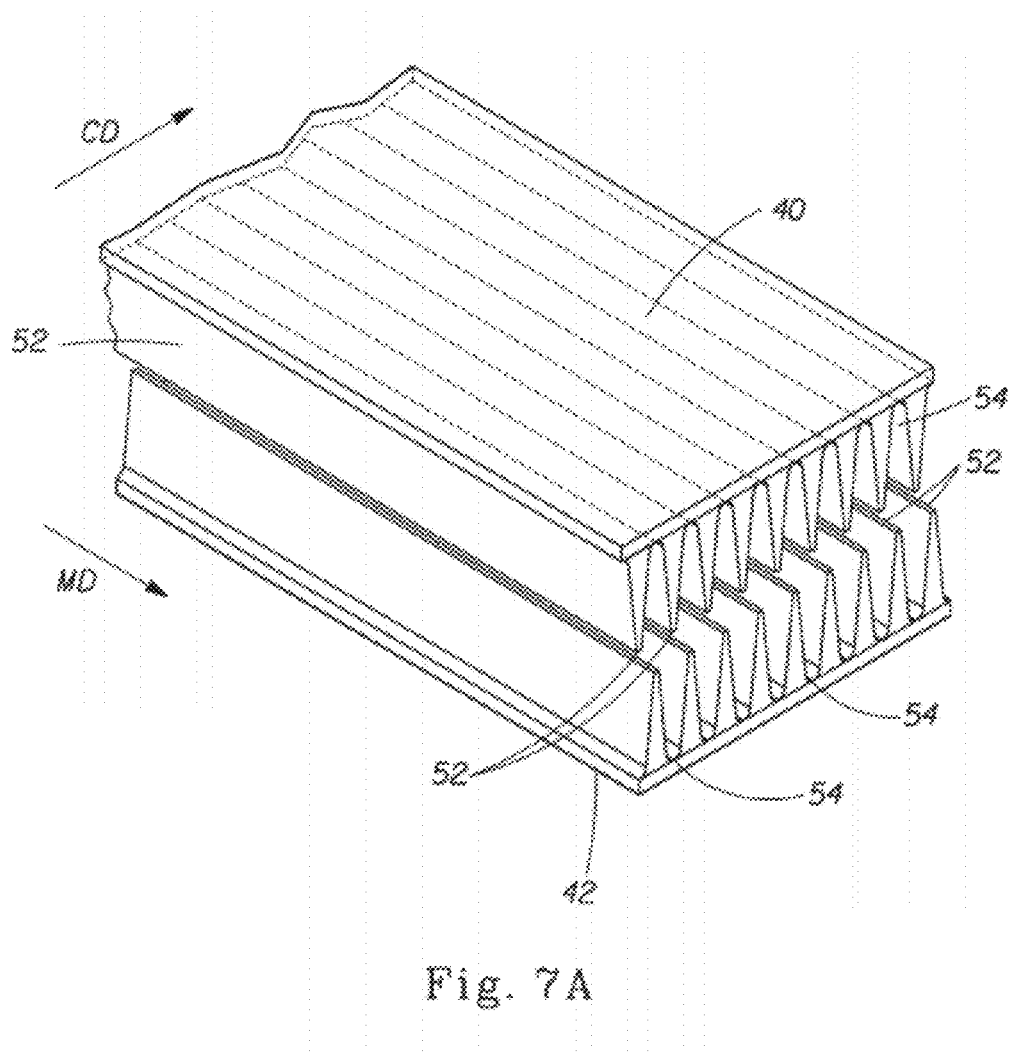
FIG. 7A is a perspective view showing portions of activation members according to the present invention showing teeth and grooves arranged in a machine direction for incrementally stretching a web in the cross machine direction.
Figure 7B:
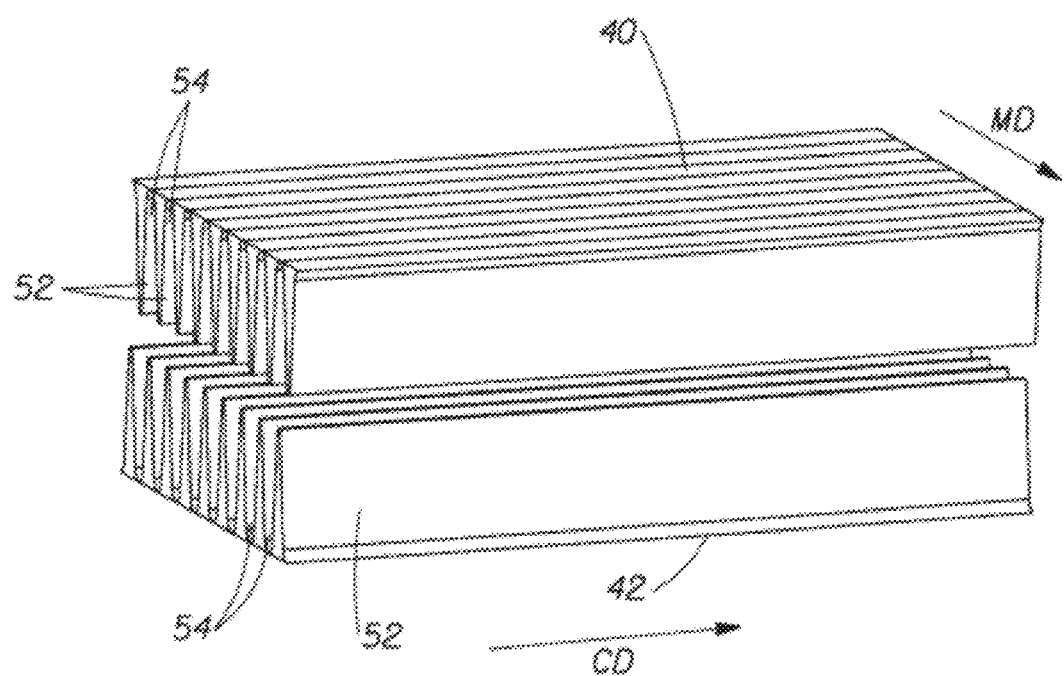
FIG. 7B is a perspective view showing portions of activation members according to the present invention showing teeth and grooves arranged in a cross machine direction for incrementally stretching a web in the machine direction.

One formation means which can be performed using the activation members of the present invention is a process commonly referred to as ring rolling where intermeshing teeth and grooves engage and incrementally stretch the web interposed therebetween. For ring rolling the activation members can be arranged to incrementally stretch the web in the cross machine direction or the machine direction depending on the orientation of the teeth and the grooves. For instance, for incremental stretching in the cross machine direction CD, teeth 52 and grooves 54 on each activation member 40, 42 are oriented in the machine direction MD as shown in FIG. 7A. Conversely, for incremental stretching in the machine direction MD, the teeth 52 and grooves 54 on each activation member 40, 42 are oriented in the cross machine direction CD as shown in FIG. 7B. Belts comprising such cross machine direction teeth and grooves are kept in phase in the machine direction with respect to the intermeshing pattern.

Figure 8:
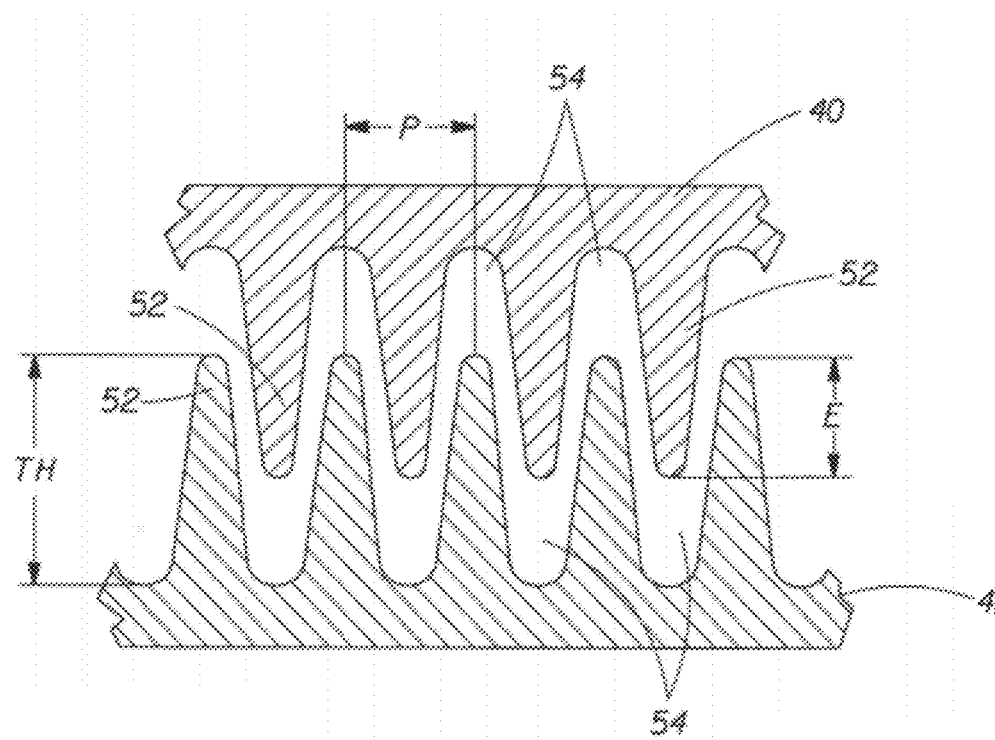
FIG. 8 is an enlarged, fragmentary, cross-sectional view showing the interengagement of teeth and grooves of activation members as shown in FIG. 7A and FIG. 7B.

FIG. 8 is an enlarged, fragmentary, cross-sectional view showing the interengagement of teeth 52 and grooves 54 of respective opposing activation members 40, 42 in a deformation zone which incrementally stretch the web. Teeth 52 have a tooth height TH and are spaced apart from one another by a preferably uniform distance to define a tooth pitch P. As shown, teeth 52 of activation 40 member extend partially into grooves 54 of the opposed activation member 42 to define a "depth of engagement", E, as shown in FIG. 8. During activation, the depth of engagement is controlled to gradually increase over at least a portion of the deformation zone.

Figure 9:
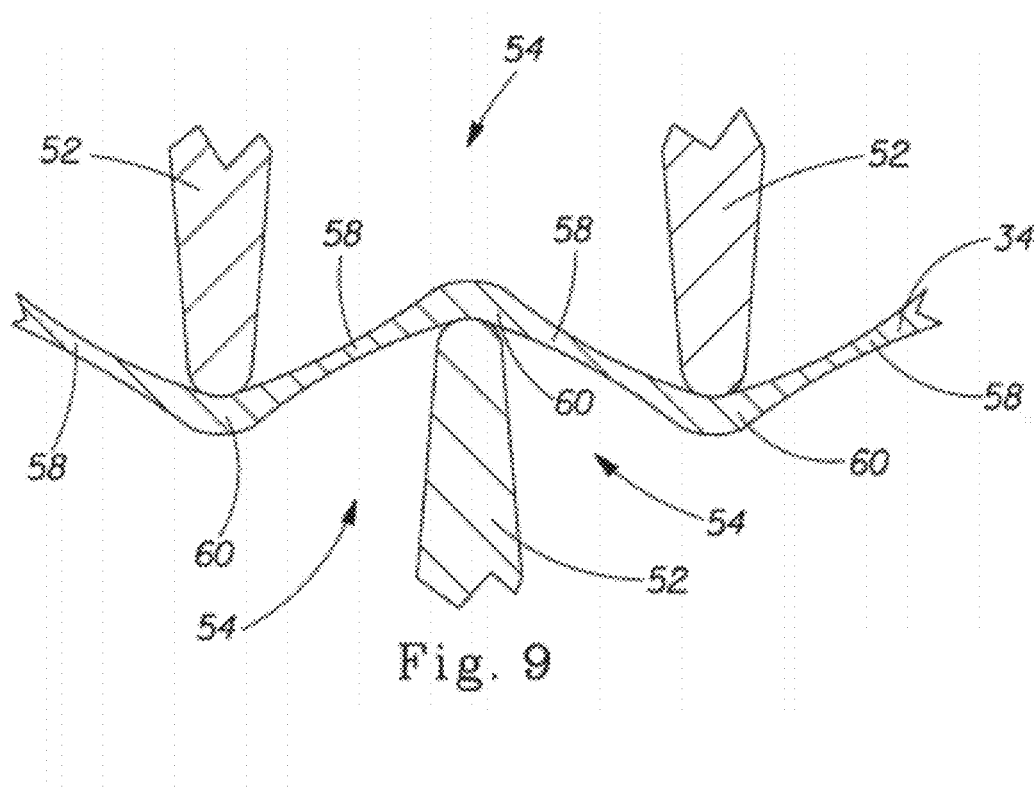
FIG. 9 is an even further enlarged view of the activation members shown in FIG. 7A and FIG. 7B showing several interengaged teeth and grooves with a web of material therebetween.

FIG. 9 is an even further enlarged view of several interengaged teeth 52 and grooves 54 in the deformation zone with a web 34 of material therebetween. As shown, a portion of a web 34, which can be nonwoven web, is received between the interengaged teeth and grooves in the deformation zone. The interengagement of the teeth and grooves causes laterally spaced portions of web 34 to be pressed by teeth 52 into opposed grooves 54. In the course of passing between activation members, the forces of teeth 52 pressing web 34 into opposed grooves 54 impose within web 34 tensile stresses that act in the machine or cross machine direction depending on the orientation of the teeth and grooves on the activation members. The tensile stresses can cause intermediate web sections 58 that lie between and that span the spaces between the tips of adjacent teeth 52 to stretch or extend in a machine or cross machine direction, which can result in a localized reduction of the web thickness at each of intermediate web sections 58. For nonwoven webs, including air laid webs, the stretching can cause fiber reorientation, a reduction in basis weight, and controlled fiber destruction in the intermediate web sections 58.

Although the portions of web 34 that lie between the adjacent teeth are locally stretched, the portions of the web that are in contact with the tips of the teeth may not undergo a similar degree of extension. Because of the frictional forces that exist between the surfaces at the rounded outer ends of teeth 52 and the adjacent areas 60 of web 34 that are in contact with the tooth surfaces at the outer ends of the teeth, sliding movement of those portions of the web surfaces relative to the tooth surfaces at the outer ends of the teeth is minimized Consequently, in some cases, the properties of the web 34 at those areas of the web that are in contact with the surfaces of the tooth tips change only slightly, as compared with the change in web properties that occur at intermediate web sections 58.

Because of the localized web stretching of web 34 that has taken place, with the consequent increase in web width or length depending on the direction of stretch, the web material that exits from the deformation zone formed by the activation members can have a lower basis weight than that of the entering web material, provided the exiting material remains in a substantially flat, laterally extended state. For instance, a web stretched in the cross machine direction may contract laterally to its original width or length as it exits from the deformation zone, in that the web is placed under some tension in the web movement direction, in which case the exiting, modified web may have the same basis weight as it had in its entering condition. If, however, the exiting web is subjected to a sufficiently high web machine direction tension, the exiting web can be made to contract to a smaller width than its original width, in which case the web will have a greater basis weight than its original basis weight. On the other hand, if the web is subjected to sufficient additional cross-web stretching by passing the modified web between so-called Mount Hope rolls, tentering frames, angled idlers, angles nips, or the like as described above, the exiting, modified web can have less than its original basis weight. Thus, by selecting a suitable tooth and groove configuration for the activation members, by selecting a suitable web movement direction tension level, and by selecting whether or not to subject the web to additional cross-web stretching, the resulting modified nonwoven web can have a web width that can range from about 20% to about 500% of the initial web width and a basis weight that is less than, equal to, or greater than the web's original basis weight.

Teeth 52 can be generally triangular in cross section having generally rounded tooth tips, as shown in FIGS. 8 and 9. As shown teeth 52 have a tooth height TH (note that TH can also be applied to groove depth; in one embodiment tooth height and groove depth can be equal), and a tooth-to-tooth spacing referred to as the pitch P. The depth of engagement E, tooth height TH, and pitch P can be varied as desired depending on the properties of the webs being processed and the desired characteristics of the processed webs.

As will be appreciated by those skilled in the art, the sizes of the respective teeth and grooves can be varied within a wide range and would still be effective to carry out the present invention. In that regard, additional structural details of suitable activation members according to the present invention are provided in U.S. Pat. No. 5,156,793, entitled "Method for Incrementally Stretching Zero Strain Stretch Laminate Sheet in a Non-Uniform Manner to Impart a Varying Degree of Elasticity Thereto," which issued on Oct. 20, 1992, to Kenneth B. Buell et al.; and in U.S. Pat. No. 5,167,897 entitled "Method for Incrementally Stretching a Zero Strain Stretch Laminate Sheet to Impart Elasticity Thereto," which issued on Dec. 1, 1992, to Gerald M. Weber et al. Other Activation patents include: U.S. Pat. No. 5,527,304, entitled "Absorbent Article with Elasticized Side Panels having Extension Panel," which issued on Jun. 18, 1996, to Buell; U.S. Pat. No. 5,674,216, entitled "Absorbent Article with Elasticized Side Panels," which issued on Oct. 7, 1997, to Buell; U.S. Pat. No. 6,476,289, entitled "Garment having Elastomeric Laminate," which issued on Jun. 18, 1996, to Buell; U.S. Pat. No. 5,628,741, entitled "Absorbent Article with Elastic Feature having a Prestrained Web Portion and Method for Forming Same," which issued on May 13, 1997, to Buell; U.S. Pat. No. 5,591,155, entitled "Disposable Training Pant having Improved Stretchable Side Panels," which issued on Jan. 7, 1997, to Nishikawa; U.S. Pat. No. 5,246,433, entitled "Elasticized Disposable Training Pant and Method of making the Same," which issued on Sep. 21, 1993, to Hasse; U.S. Pat. No. 5,464,401, entitled "Elasticized Disposable Training Pant having Differential Extensibility," which issued on Sep. 21, 1993, to Hasse; U.S. Pat. No. 5,575,783, entitled "Absorbent Article with Dynamic Elastic Feature Comprising Elasticized Hip Panels," which issued on Nov. 19, 1996, to Clear; U.S. Pat. No. 5,779,691, entitled "Fastening Tape for a Sanitary Article Particularly Disposable Diaper," which issued on Jul. 14, 1998, to Schmitt; U.S. Pat. No. 5,143,679, entitled "Method for Sequentially Stretching Zero Strain Stretch Laminate Web to Impart Elasticity thereto Without Rupturing the Web," which issued on Sep. 1, 1992, to Weber; U.S. Pat. No. 4,834,741, entitled "Diaper with Elastic Waist Band Elastic," which issued on May 30, 1989, to Sabee; and U.S. Pat. No. 4,968,313, entitled "Diaper with Elastic Waist Band Elastic," which issued on Nov. 6, 1989, to Sabee.

An advantage of the present invention is that the path length of the deformation zone can be easily adjusted to be several times greater in length than processes of the prior art. The depth of engagement of the intermeshing teeth and grooves can be set to accommodate web speed, which is the speed the web flows in the machine direction during processing. Specifically, it is often desirable to increase the path length of the deformation zone with increasing line speed. This is done so that the incremental stretching of the web is performed over a longer distance, and hence over a longer period of time, in spite of the increased web speed. The action of increasing the deformation zone path length for increasing web speeds can be used to offset the deleterious effects of high speed activation noted in the prior art, such as in aforementioned U.S. Pat. No. 5,143,679 issued to Weber et al. Such prior art ring rolling, accomplished with intermeshing cylindrical rolls, provides a deformation zone(s) having only a fixed path length, fully determined only by the size of the rolls and the required degree of engagement.

Table I demonstrates how the ring roll diameter increases significantly for deformation path lengths exceeding 1.0 inches (0.025 meters) in length. For instance, providing a deformation zone path length of 2.0 inches (0.051 meters) would require a ring roll diameter of about 96 inches (2.44 meters). A deformation path length of 39 inches (1 meter) would require a set of ring rolls of the prior art approaching 1 kilometer in diameter. Therefore, it can be seen that larger deformation path lengths, while often being desirable to reduce the deleterious effects of higher web speeds, would require use of impractical ring roll sizes. The Table also shows the estimated machine direction length (MD Length) of the dual activation belt (belt/belt) and single activation roll and activation belt (belt/Roll) apparatus for each corresponding deformation zone path length.

TABLE I

| Range of Deformation Zone Path Length (m/in) | Corresponding Ring Roll Diameter @ 0.080" DOE (m/in) | Estimated Belt/Belt MD Length* (m/in) | Estimated Belt/Roll MD Length* (m/in) |
| --- | --- | --- | --- |
| 0.012/0.48 | 0.144/5.7 | 0.402/15.8 | 0.395/15.6 |
| 0.025/0.99 | 0.610/24 | 0.415/16.3 | 0.401/15.8 |
| 0.050/2.0 | 2.44/96 | 0.440/17.3 | 0.411/16.2 |
| 0.100/3.9 | 9.91/390 | 0.490/19.3 | 0.432/17.0 |
| 0.290/11.5 | 82.5/3250 | 0.680/26.8 | 0.513/20.2 |
| 1.00/39 | 991/39000 | 1.39/54.7 | 0.815/32.1 |
| 3.00/118 | — | 3.39/133 | 1.66/65.4 |
| 6.00/236 | — | 6.39/252 | 2.94/116 |

*MD Length is defined as the minimum space in the machine direction required for the apparatus.
Assumptions:
1. Belt/Belt MD length = the deformation zone path length plus 0.39 m for accompanying rollers.
2. Belt/Roll MD length = the roll diameter plus 0.39 m for the accompanying back-up rollers.
3. Maximum Belt/Roll deformation zone path length = 0.75*roll circumference (i.e. 270 degree of wrap)

Figure 10A:
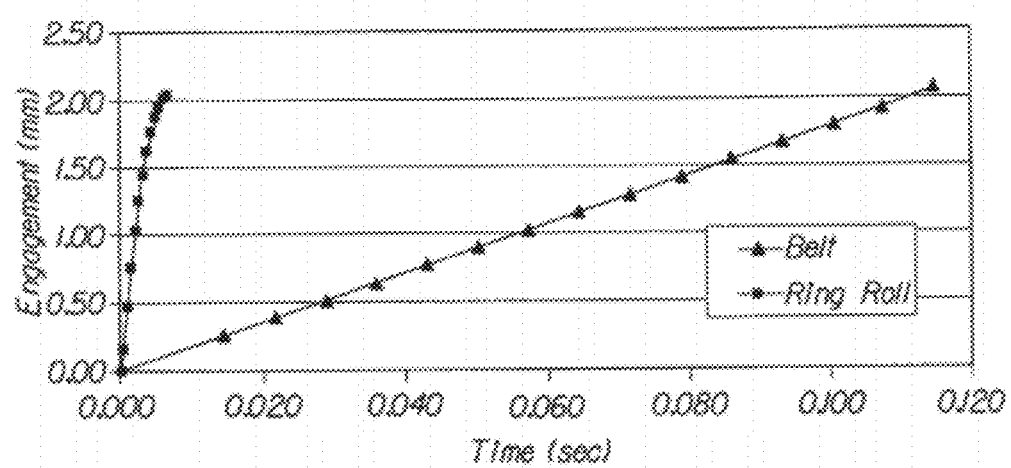
FIG. 10A is a graph comparing the increase in depth of engagement vs. time for activation belts according to the present invention and intermeshing ring rolls.
Figure 10B:
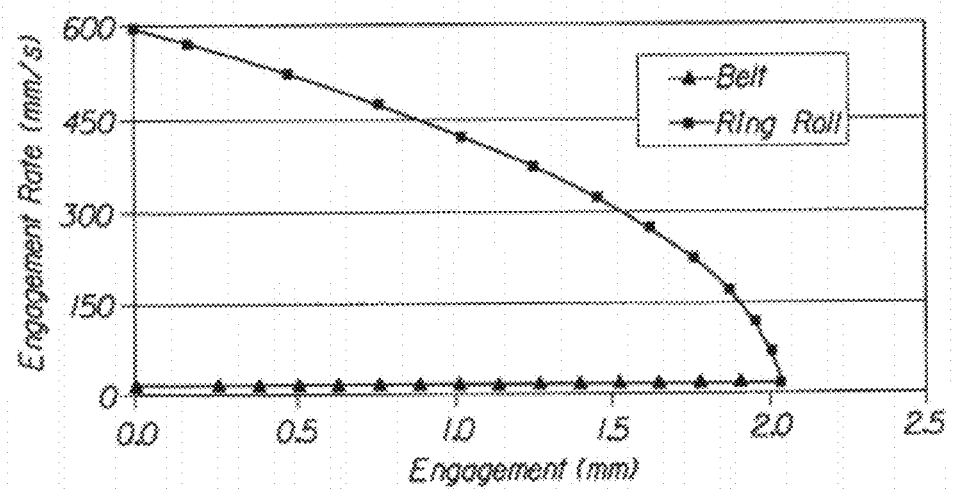
FIG. 10B is a graph comparing the rate of change of engagement vs. engagement for activation belts according to the present invention and intermeshing ring rolls.

The beneficial effects of increased deformation zone path length produced via the methods and apparatus of the present invention can be further described in the graphs shown in FIG. 10A and FIG. 10B. Assuming a web speed of about 500 ft/min (2.54 meters per second), a belt pitch of 0.060 inches (1.52 mm) and a depth of engagement of 0.079 inches (2 0 mm), the graph in FIG. 10A shows the depth of engagement vs. the time of engagement comparing a ring roll system of the prior art to apparatus of the present invention. The plot illustrates how the path length of the deformation zone for the apparatus of the present invention can be sized and arranged to provide a gradual linear increase in depth of engagement compared to a rapid non linear increase associated with the shorter deformation zone path length of ring rolls. The resulting effect of these differing path lengths is shown in the graph of FIG. 10B, in which the corresponding rate of activation, or rate of engagement, is plotted vs. depth of engagement. The graph demonstrates how ring roll processes of the prior art induce very high rates of strain in the material compared to the very low (and in this case) constant rate of strain applied by methods and processes of the present invention. This significant decrease in the rate of engagement results in a correspondingly reduced rate of deformation to the web, which effectively minimizes or eliminates the aforementioned deleterious effects that high activation rates have on many web materials.

Another means for deforming a web which can be performed using the activation members of the present invention is a process commonly referred to as a "SELF" or "SELF'ing" process, in which SELF stands for Structural Elastic Like Film. While the process was originally developed for deforming polymer film to have beneficial structural characteristics, it has been found that the SELF'ing process can be used to produce beneficial structures in nonwoven webs.

Figure 11:
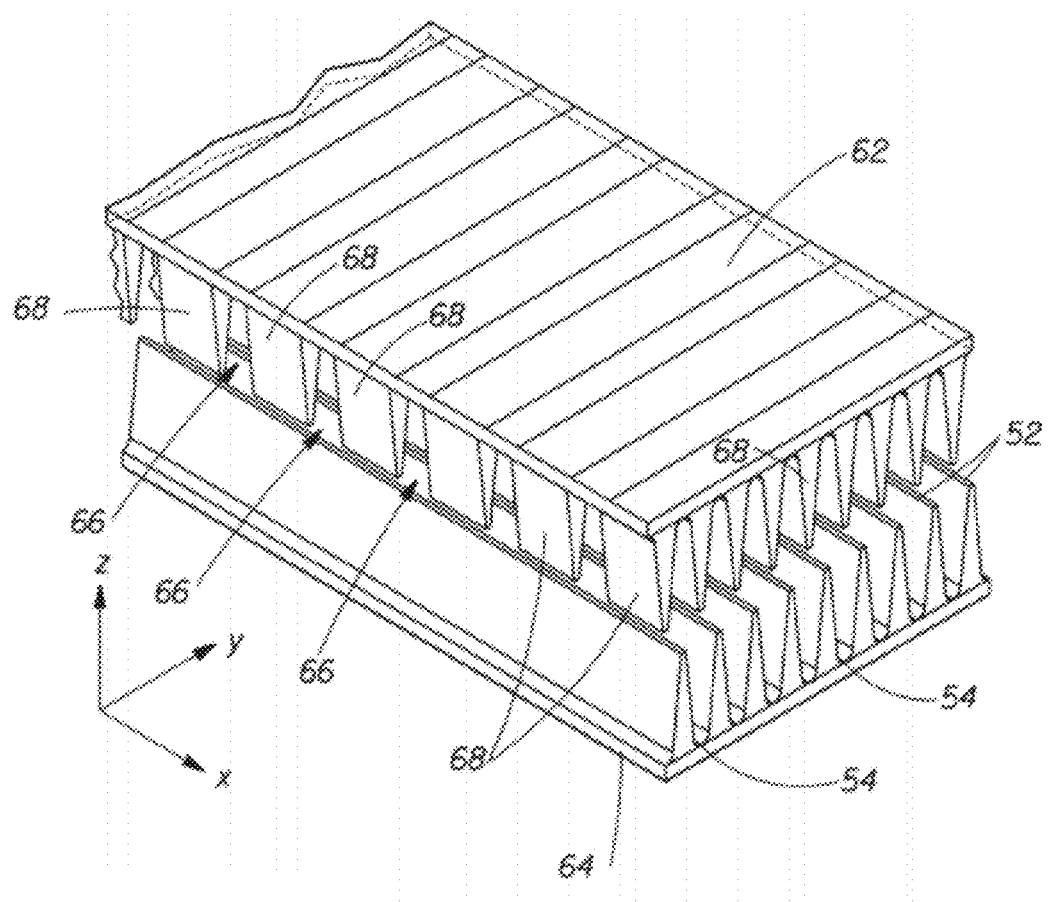
FIG. 11 is a perspective view showing portions of activation members according to the present invention for use in a SELF process.

Referring to FIG. 11, there is shown a configuration of activation members for use in a SELF process that can be employed to expand portions of a nonwoven web in the web thickness dimension, by expanding portions of the web out of the X-Y plane in the Z-direction. As shown in FIG. 11, one activation member 64 includes a plurality of longitudinally-extending, laterally-spaced teeth 52 and grooves 54. Activation member 62 includes a plurality of longitudinally extending, laterally-spaced teeth 68 wherein portions of the teeth 68 of activation member 62 have been removed to form notches 66 that define a plurality of spaced teeth 68. As shown in FIG. 11, notches 66 on respective transversely adjacent teeth 68 can be aligned laterally to define a plurality of spaced groups of notched regions about the surface of the activation member 62. The respective laterally-extending groups of notched regions each extend parallel to the cross machine direction CD of the activation member 62. Teeth 68 can have a tooth height corresponding to tooth height TH, and a tooth pitch corresponding to the tooth pitch P as previously described in reference to FIG. 8.

As a web passes through a deformation zone formed by activation members in a SELF process, the teeth 68 of activation member 62 press a portion of the web out of plane to cause permanent, localized Z-direction deformation of the web. But the portion of the web that passes between the notched regions 66 of activation member 62 and the teeth 68 of activation member 62 will be substantially unformed in the Z-direction, i.e., the nonwoven web will not be deformed or stretched in that area to the same degree as that of the toothed regions, and can remain substantially planar, while the portions of the web passing between toothed regions of activation member 62 and the teeth 52 of activation member 64 can be deformed or stretched beyond the elastic limit of the nonwoven, resulting in a plurality of deformed, raised, rib-like elements.

Figure 12:
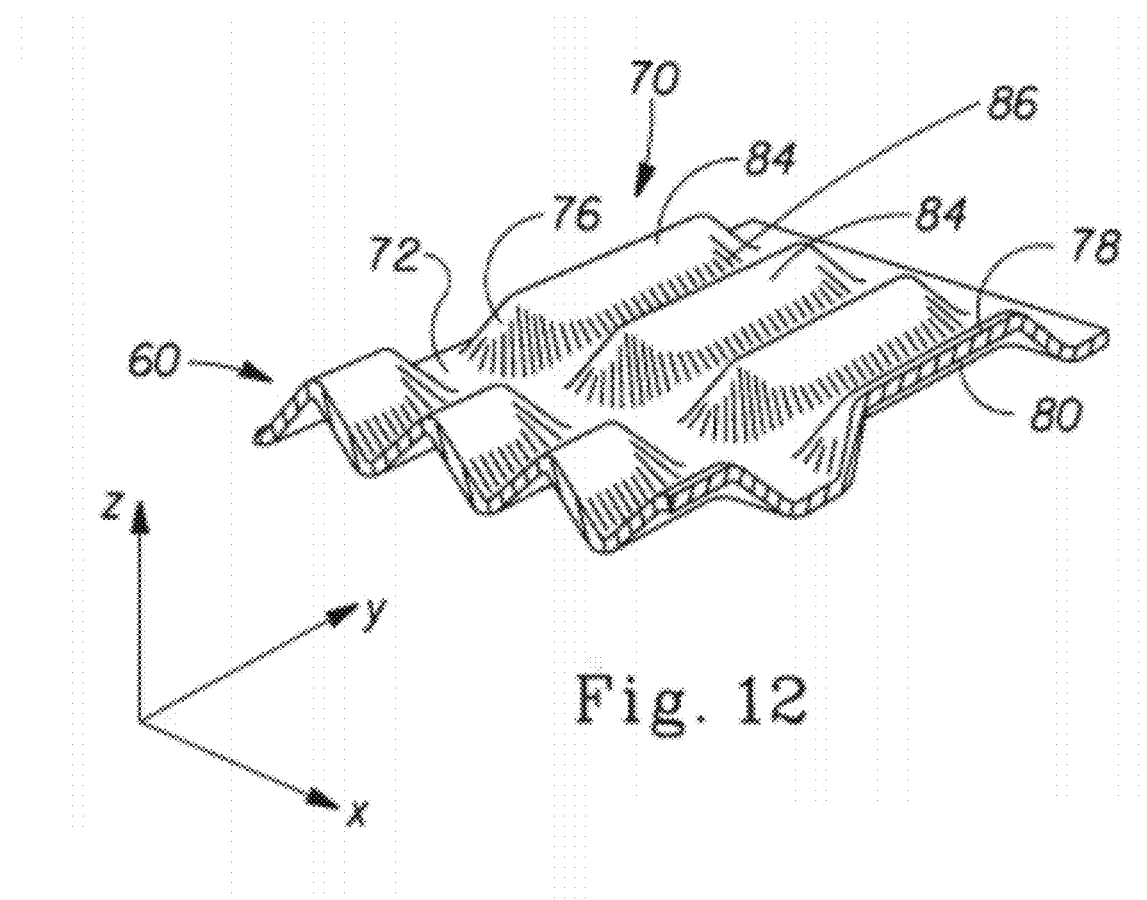
FIG. 12 is a schematic representation of a web after it has passed between a pair of inter-meshing SELF rolls.

Referring now to FIG. 12, there is shown a schematic representation of a portion of a SELF'ed nonwoven web 70 after it has passed between a pair of opposed, interengaged activation members 62 and 64 of a SELF process, the activation members having the tooth configurations similar to that shown in FIG. 11. SELF'ed nonwoven web 70 includes a network of distinct regions. The network includes at least a first region 72, a second region 84, and a transitional region 76, which is at the interface between the first region 72 and the second region 84. SELF'ed nonwoven web 70 also has a first surface 78 and an oppositely-facing second surface 80. In the embodiment shown in FIG. 12, SELF'ed nonwoven web 70 includes a plurality of substantially flat spaced first regions 72 and a plurality of alternating rib-like elements forming the second region 84.

In the embodiment shown in FIG. 12, first regions 72 are substantially planar. That is, the material within first regions 72 is substantially flat and is in substantially the same condition after the modification step undergone by a nonwoven web by passage between activation members 62 and 64 shown in FIG. 11 as it was in before the web was passed between the activation members.

Figure 13:
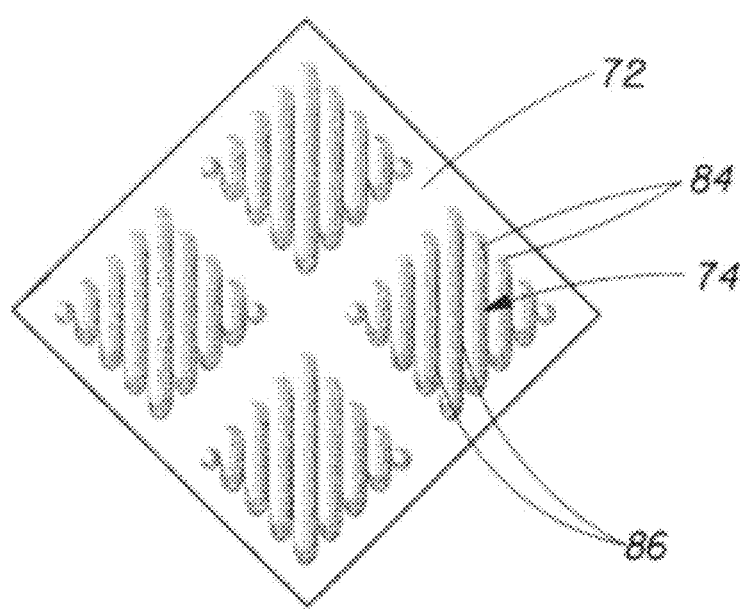
FIG. 13 is a pattern that can be produced in a web by passing the web between a pair of intermeshing SELF activation members.

In addition to the surface pattern illustrated in FIG. 12 in the form of rib-like elements each having substantially equal lengths and arranged in rows to define generally rectangular areas of deformation separated by linear first regions 72, the desired formation of a nonwoven web can, if desired, be effected by other activation member tooth and groove configurations that can cause localized stretching and/or deformation of the nonwoven material. For example, as shown in FIG. 13, instead of spaced rectangular arrays of rib-like elements the deformation pattern can be in the form of rib-like elements defining an array of spaced, diamond-shaped second regions 74 with intervening undeformed first regions 72. Each such diamond-shaped second region 74 is defined by alternating rib-like elements 84 and intervening valleys 86. Examples of methods and apparatus for formation of such diamond-shaped elements are disclosed in U.S. Pat. No. 5,650,214, entitled, "Sheet Materials Exhibiting Elastic-Like Behavior and Soft, Cloth-Like Texture," which issued on Jul. 22, 1997, to Barry J. Anderson, et al., and U.S. Pat. No. 6,383,431, entitled, "Method of Modifying a Nonwoven Fibrous Web For Use as a Component of a Disposable Absorbent Article," which issued May 7, 2002, to Dobrin, et al.

Figure 14:
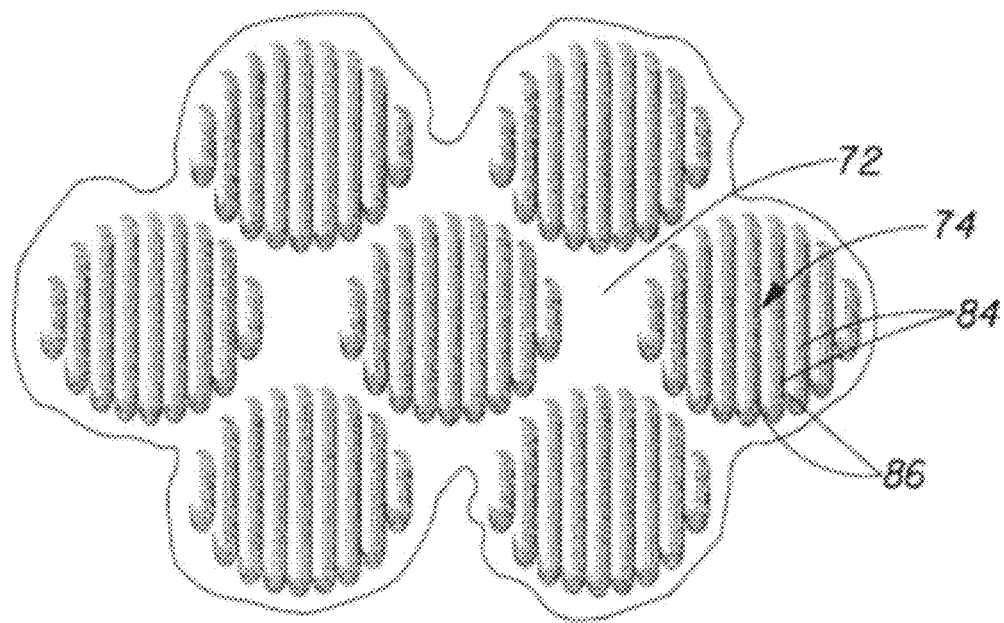
FIG. 14 is a pattern that can be produced in a web by passing the web between a pair of intermeshing SELF activation members.

As shown in FIG. 14, the deformation pattern can also be in the form of rib-like elements 84 that together define an array of spaced, circularly-shaped second regions 74. Each such circular element can be defined by appropriately spaced, varying-length rib-like elements 84 and intervening valleys 86. Between respective circularly-shaped second regions 74 are unformed intervening first regions 72. As will be apparent to those skilled in the art, other deformation patterns can also be employed, if desired, such as those illustrated and described in U.S. Pat. No. 5,518,801, entitled "Sheet Materials Exhibiting Elastic-Like Behavior," which issued on May 21, 1996, to Charles W. Chappell et al. Other patents issued to Chappell include U.S. Pat. No. 5,691,035 entitled "Web Materials Exhibiting Elastic-like Behavior," issued Nov. 25, 1997; U.S. Pat. No. 5,723,087 entitled "Web Materials Exhibiting Elastic-like Behavior," issued Mar. 3, 1998; U.S. Pat. No. 5,891,544 entitled "Web Materials Exhibiting Elastic-like Behavior" issued Apr. 6, 1999; U.S. Pat. No. 5,916,663 entitled "Web Materials Exhibiting Elastic-like Behavior," issued Jun. 29, 1999; and U.S. Pat. No. 6,027,483 entitled "Web Materials Exhibiting Elastic-like Behavior" issued Feb. 22, 2000.

Another means for deforming a web which can be performed using the activation members of the present invention is a process that can best be described as "micro-SELF". Micro-SELF is a process that is similar in apparatus and method to that of the SELF process described with reference to FIG. 11. The main difference between SELF and micro-SELF is the size and dimensions of the teeth 68 on the toothed activation member, i.e., the micro-SELF activation member 82 in FIG. 15, which corresponds to activation member 62 of FIG. 11. The micro-SELF activation member 82 can be one of the activation members forming the deformation zone in a preferred configuration having one patterned activation member, e.g., micro-SELF activation member 82, and one non-patterned grooved activation member (not shown). However, in certain embodiments it may be preferable to use two micro-SELF activation members 82 having either the same or differing patterns, in the same or different corresponding regions of the respective activation members. Such an apparatus can produce webs with deformations that, in nonwoven webs, can be described as tufts protruding from one or both sides of the processed web. The tufts can be closely spaced, but at least at their base can be spaced apart sufficiently to define void regions between tufts.

Figure 15:
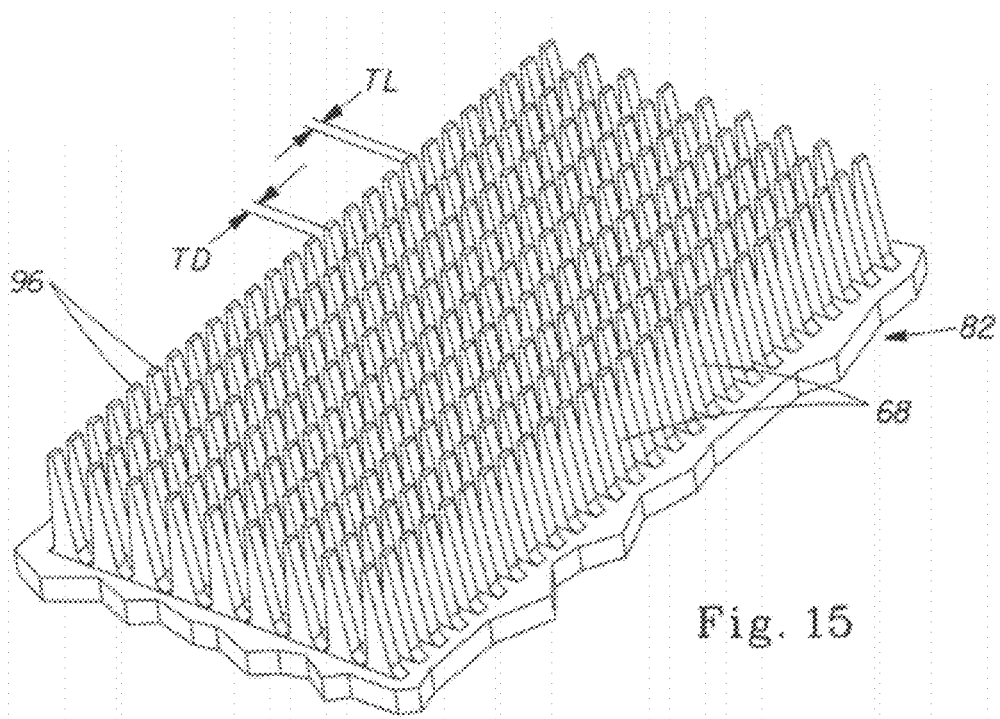
FIG. 15 is a perspective representation of an activation member for use in a micro-SELF apparatus.
Figure 16:
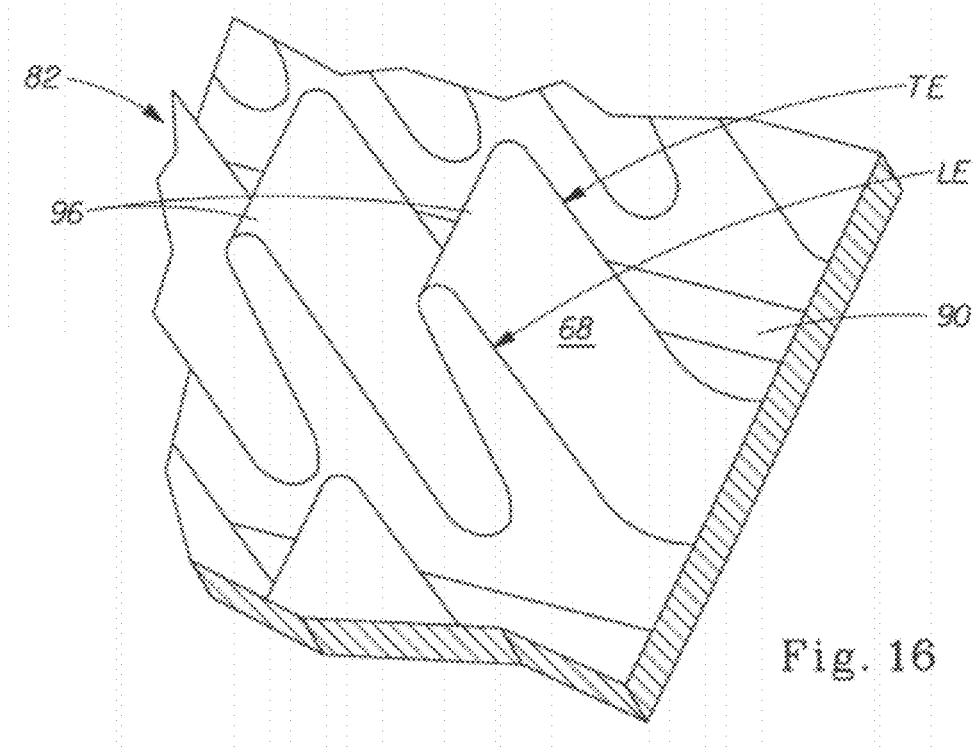
FIG. 16 is an enlarged perspective representation of the teeth on a micro-SELF activation member.

As shown in the partial perspective view of FIG. 15 and the enlarged partial perspective view of FIG. 16, the teeth 68 of a micro-SELF activation member 82 have a specific geometry associated with the leading and trailing edges of teeth 68 that permit the teeth to essentially "punch" through the nonwoven web as opposed to, in essence, deforming the web into bumps or teeth as shown in FIGS. 12-14. In some embodiments of a nonwoven web, the teeth 68 urge fibers out-of-plane and to form what can be described as "tufts" or loops of fibers. In one embodiment, the web is punctured, so to speak, by the teeth 68 pushing the fibers through to form tufts or loops. Therefore, unlike the "tent-like" rib-like elements of SELF webs which each have continuous side walls associated therewith, i.e., a continuous "transition zone," the tufts or loops forced out-of-plane in a micro-SELF process can have a discontinuous structure associated with the side wall portions of the Z-direction deformations. Additionally, when utilized for relatively high basis weight absorbent core materials, the "tufting" can be somewhat invisible as fibers are urged out of the plane in a Z-direction with respect to one of the web surfaces, the Z-direction deformation may be muted or non-existent in the other web surface. Further, when a laminate material is involved, the Z-direction deformations of one web material may be pushed into and "hidden" by the second material of the laminate, such that the "tufting" is essentially invisible to the naked eye.

As shown in FIGS. 15 and 16, each tooth 68 has a tooth tip 96, a leading edge LE and a trailing edge TE. The tooth tip 96 is elongated and has a generally longitudinal orientation. It is believed that to get tufted, looped tufts in the processed web, the LE and TE should be very nearly orthogonal to the local peripheral surface 90 of activation member 82. As well, the transition from the tip 96 and LE or TE should be a sharp angle, such as a right angle, having a sufficiently small radius of curvature such that teeth 68 push through the web at the LE and TE. Without being bound by theory, it is believed that having relatively sharply angled tip transitions between the tip 96 of tooth 68 and the LE and TE permits the teeth 68 to punch through nonwoven webs "cleanly", that is, locally and distinctly, so that one side of the resulting web can be described as "tufted" or otherwise "deformed."

The teeth 68 of a micro-SELF activation member 82 can have a uniform length dimension TL measured generally from the leading edge LE to the trailing edge TE at the tooth tip 96 of about 1.25 mm and are uniformly spaced from one another circumferentially by a distance TD of about 1.5 mm For making a terry-cloth web from a web having a total basis weight in the range of about 60 to about 100 gsm, teeth 68 can have a length TL ranging from about 0 5 mm to about 3 mm and a spacing TD from about 0.020 inches (0.5 mm) to about 0.118 inches (3 mm), a tooth height ranging from about 0.020 inches (0.5 mm) to about 0.200 inches (5 mm), and a pitch between about 0.040 inches (1 mm) and about 0.200 inches (5 mm). Depth of engagement can be from about 0.020 inches (0.5 mm) to about 0.200 inches (5 mm) (up to a maximum equal to tooth height). Of course, depth of engagement, pitch, tooth height, TD, and TL can be varied independently of each other to achieve a desired size, spacing, and area density of web deformations as disclosed in co-pending, commonly owned patent applications US 2004/0265534A1, filed Dec. 16, 2003 and US 2005/0123726A1, filed Nov. 3, 2004.

Figure 17:
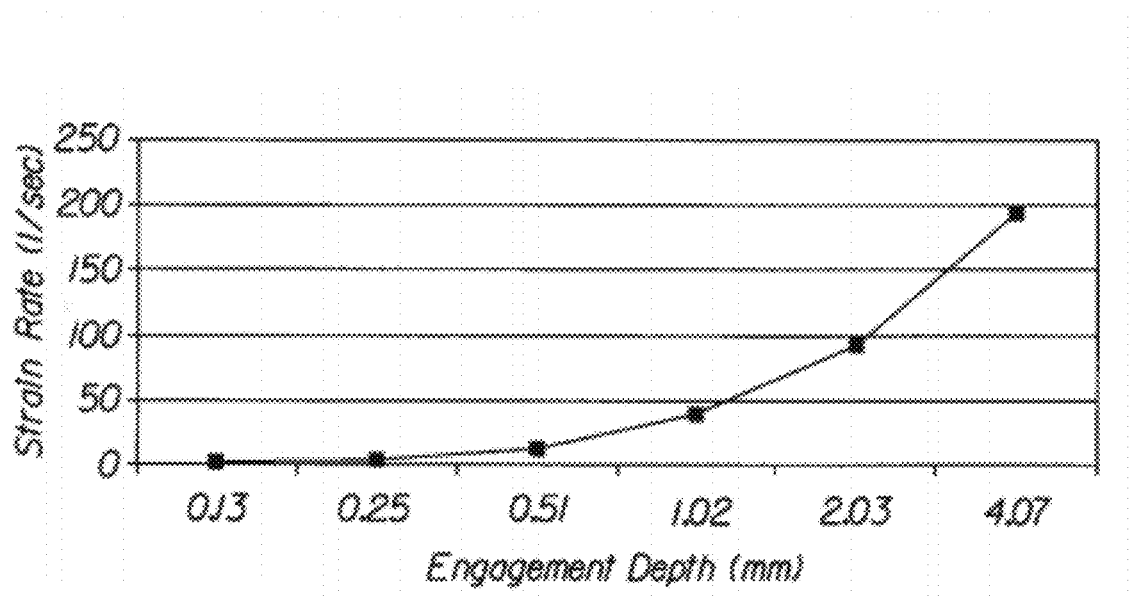
FIG. 17 is a graph showing strain rate varying from low to high in the deformation zone during micro-SELF activation.
Figures 18A, 18B:
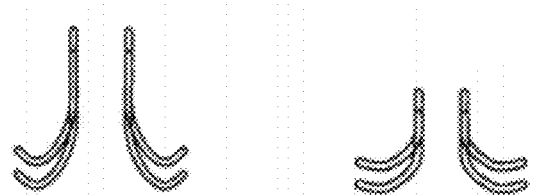
FIG. 18A is a tuft formed in a laminate via micro-SELF activation according to the strain rate depicted by the graph in FIG. 17.
FIG. 18B is a tuft formed during micro-SELF activation using high strain rate activation rolls.

Using the micro-SELF activation members according to the present invention, the strain rate in the deformation zone can be controlled to produce web structures exhibiting different tuft and loop formations. For instance, for laminate structure comprising two relatively inextensible materials, the strain rate in the deformation zone can be controlled to vary from low to high as illustrated in the graph in FIG. 17 providing tufts comprising taller loops with blown out tips illustrated in FIG. 18A in comparison to smaller loops with blown out tips formed via high strain rate activation illustrated in FIG. 18B. Alternatively, for relatively inextensible materials with slightly different extensibilities, varying the strain rate in the deformation zone from a high rate of strain to a low rate of strain as illustrated in the graph in FIG. 19 can result in one of the materials bursting early on resulting in a blown out tip and the other material forming a tall loop extending through the blown out tip illustrated in FIG. 20A in comparison to smaller loops with blown out tips formed via high strain rate activation illustrated in FIG. 20B.

Figure 21:
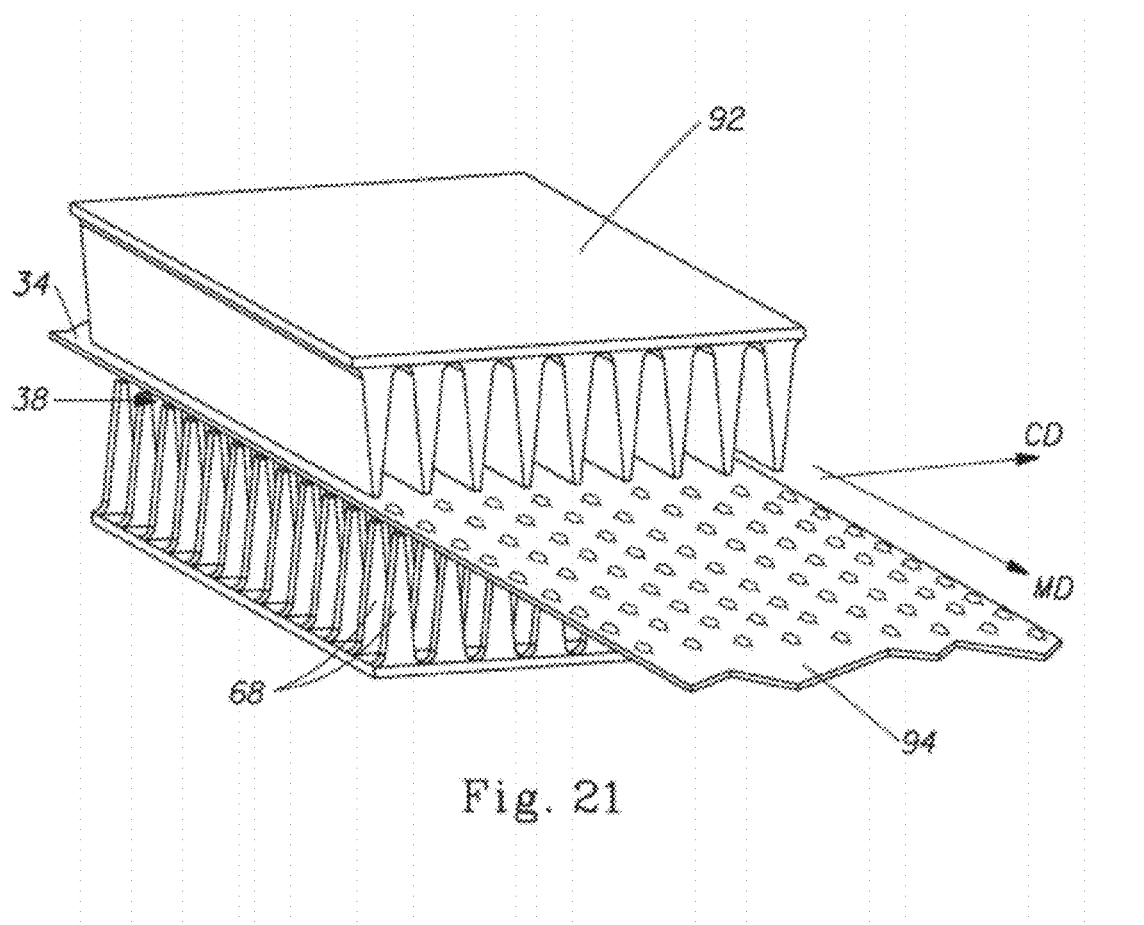
FIG. 21 is a schematic representation of activation members configured for a rotary knife aperturing.

Another means for deforming a web which can be performed using the activation members of the present invention is a process that can best be described as "rotary knife aperturing" (RKA). In RKA, a process and apparatus using intermeshing activation members 92 similar to that described above with respect to SELF or micro-SELF activation members is utilized, as shown in FIG. 21. As shown, the RKA process differs from SELF or micro-SELF in that the relatively flat, elongated teeth of a SELF or micro-SELF activation member have been modified to be generally pointed at the distal end. Teeth 68 can be sharpened to cut through as well as deform nonwoven web 34 to produce a three-dimensionally apertured web 94 as shown in FIG. 21. In other respects such as tooth height, tooth spacing, pitch, depth of engagement, and other processing parameters, RKA and the RKA apparatus can be the same as described above with respect to SELF or micro-SELF.

Figure 22:
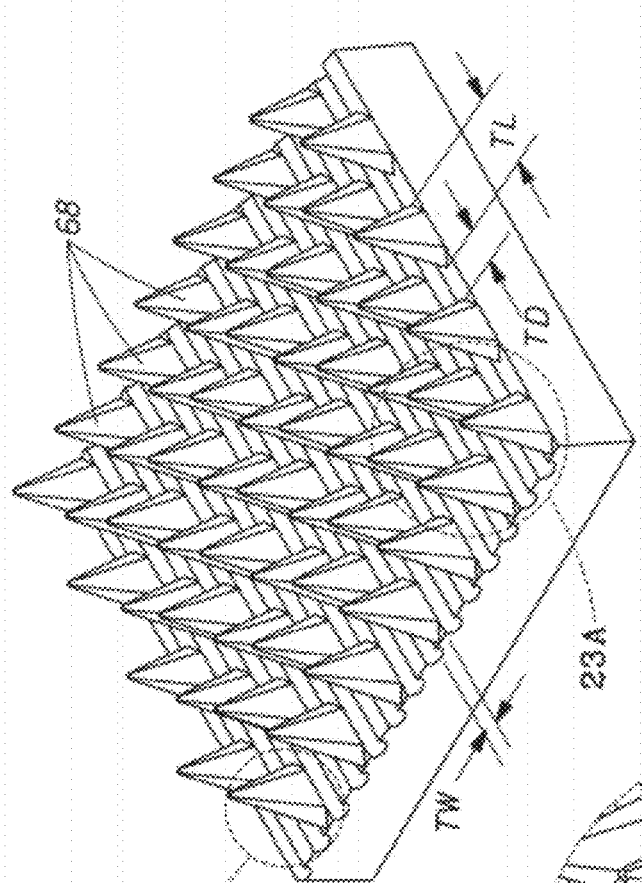
FIG. 22 is a perspective view of a rotary knife aperturing activation member.
Figure 23A:
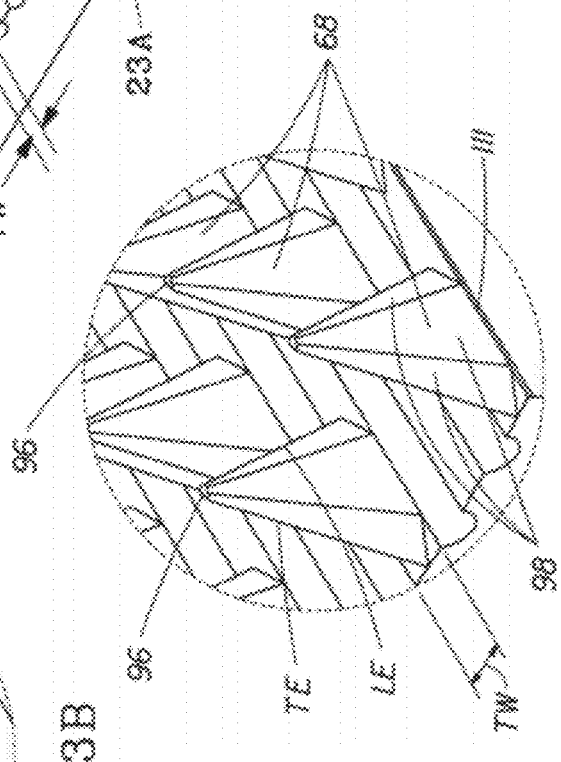
FIG. 23A is an enlarged view of the rotary knife aperturing activation member shown in FIG. 22.
Figure 23B:
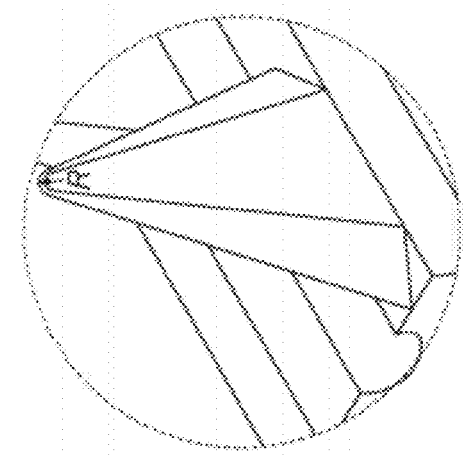
FIG. 23B is an enlarged view of a tooth on the rotary knife aperturing activation member shown in FIG. 22.

FIG. 22 shows a portion of one embodiment of an RKA toothed activation member having a plurality of teeth 68 useful for making an apertured web 94. An enlarged view of the teeth 68 is shown in FIGS. 23 A and 23B. As shown in FIG. 23A, each tooth 68 has a base 111, a tooth tip 96, a leading edge LE and a trailing edge TE. The tooth tip 96 can be generally pointed, blunt pointed, or otherwise shaped so as to stretch and/or puncture the web 34. Teeth 68 can have generally flattened, blade-like shape. Teeth 68 can have generally flattened distinct sides 98. That is, as opposed to round, pin-like shapes that are generally round in cross section, teeth 68 can be elongated in one dimension, having generally non-round, elongated cross-sectional configurations. For example, at their base, teeth 68 can have a tooth length TL and a tooth width TW exhibiting a tooth aspect ratio AR of TL/TW of at least 2, or at least about 3, or at least about 5, or at least about 7, or at least about 10 or greater. In one embodiment, the aspect ratio AR of cross-sectional dimensions remains substantially constant with tooth height.

In one embodiment of an RKA toothed activation member, teeth 68 can have a uniform length dimension TL of about 0.049 inches (1.25 mm) measured generally from the leading edge LE to the trailing edge TE at the base 111 of the tooth 68, and a tooth width TW of about 0.012 inches (0.3 mm) which is the longest dimension measured generally perpendicularly to the length dimension at the base. Teeth can be uniformly spaced from one another by a distance TD of about 0.059 inches (1.5 mm). For making a soft, fibrous three-dimensional apertured web from a web having a basis weight in the range of from about 5 gsm to about 200 gsm, teeth 68 can have a length TL ranging from about 0.5 mm to about 3 mm, a tooth width TW of from about 0.3 mm to about 1 mm, and a spacing TD from about 0.5 mm to about 3 mm, a tooth height TH ranging from about 0.5 mm to about 10 mm, and a pitch P between about 1 mm (0.040 inches) and 2.54 mm (0.100 inches). Depth of engagement E can be from about 0.020 inches (0.5 mm) to about 0.200 inches (5 mm) (up to a maximum approaching the tooth height TH).

Of course, E, P, TH, TD and TL can each be varied independently of each other to achieve a desired size, spacing, and area density of apertures (number of apertures per unit area of apertured three-dimensionally apertured web 94). For example, to make apertured films and nonwovens suitable for use in sanitary napkins and other absorbent articles, tooth length TL at the base can range between about 0.08 inches (2.032 mm) to about 0.15 inches (3.81 mm); tooth width TW can range from about 0.02 inches (0.508 mm) to about 0.05 inches (1.27 mm); tooth spacing TD can range from about 0.039 inches (1.0 mm) to about 0.076 inches (1.94 mm); pitch P can range from about 0.044 inches (1.106 mm) to about 0.100 inches (2.54 mm); and tooth height TH can be from about 0.08 inches (2.032 mm) to about 0.27 inches (6.858 mm). Depth of engagement E can be from about 0.020 inches (0.5 mm) to about 0.200 inches (5 mm). The radius of curvature R of the tooth tip 96 shown in FIG. 23B can be from $3.937 \times 10^{-5}$ inches 0.001 mm to about $3.9 \times 10^{-4}$ inches (0.009 mm). Without being bound by theory, it is believed that tooth length TL at the base can range between about 0.01 inches (0.254 mm) to about 0.5 inches (12.7 mm); tooth width TW can range from about 0.01 inches (0.254 mm) to about 0.2 inches (5.08 mm); tooth spacing TD can range from about 0.0 mm to about 1.0 inches (25.4 mm) (or more); pitch P can range from about 0.044 inches (1.106 mm) to about 0.3 inches (7.62 mm); tooth height TH can range from 0.01 inches (0.254 mm) to about 0.709 inches (18 mm); and depth of engagement E can range from 0.01 inches (0.254 mm) to about 0.25 inches (6.35 mm). For each of the ranges disclosed, it is disclosed herein that the dimensions can vary within the range in increments of $3.937 \times 10^{-5}$ (0.001 mm) from the minimum dimension to the maximum dimension, such that the present disclosure is teaching the range limits and every dimension in between in $3.937 \times 10^{-5}$ inch (0.001 mm) increments (except for radius of curvature R, in which increments are disclosed as varying in $3.937 \times 10^{-5}$ inch (0.0001 mm) increments).

RKA teeth can have other shapes and profiles and the RKA process can be used to aperture fibrous webs, as disclosed in co-pending, commonly owned patent applications US 2005/0064136A1, filed Aug. 6, 2004, US 2006/0087053A1, filed Oct. 13, 2005, and US 2005/021753 filed Jun. 21, 2005.

The apparatus of the present invention may be arranged sequentially and/or intermixed with aforementioned apparatus described in the prior art. For example, a first apparatus of the present invention can be used to incrementally stretch the web in the cross machine direction followed by a second apparatus which can be used to incrementally stretch the web in the machine direction.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for incrementally stretching a web, the apparatus comprising:
  a. a single activation member comprising a plurality of teeth and grooves;
  b. an activation belt comprising a plurality of teeth and grooves that complement the plurality of teeth and grooves of the single activation member;
  c. a deformation zone formed between the activation belt and the single activation member wherein the plurality of teeth and grooves of the single activation member engage the plurality of teeth and grooves of the activation belt at a controlled depth of engagement capable of increasing linearly over the deformation zone such that a web interposed between the activation belt and the single activation member in the deformation zone is incrementally stretched; and
  d. a series of back-up rollers located adjacent to a side of the activation belt opposite a side of the activation belt that faces said activation member, said series of back-up rollers capable of forcing a section of the activation belt into engagement with the single activation member, wherein there is a radial distance between an outer surface of the single activation member and each of the back-up rollers, where there is a first back-up roller and a last back-up roller, and the radial distance between the outer surface of the single activation member and each of the back-up rollers decreases an amount for each succeeding back-up roller from the first to the last back-up roller so that the depth of engagement increases continuously over the deformation zone.

2. The apparatus according to claim 1 wherein the single activation member comprises a single activation roll having a plurality of circumferential teeth and grooves.

3. The apparatus according to claim 2 wherein the deformation zone is formed between a first section of a plurality of teeth and grooves of the activation belt and an arcuate section of a plurality of circumferential teeth and grooves of the single activation roll.

4. The apparatus according to claim 3 wherein the depth of engagement is controlled by the series of back-up rollers arranged along the deformation zone supporting the first section of the plurality of teeth and grooves of the activation belt along the arcuate section of the plurality of circumferential teeth and grooves of the single activation roll.

5. The apparatus according to claim 4 wherein the depth of engagement is controlled to increase linearly over at least a portion of the deformation zone.

6. The apparatus according to claim 1 wherein the activation belt comprises a first activation belt and the single activation member comprises a second activation belt comprising a plurality of teeth and grooves that complement and engage the plurality of teeth and grooves of the first activation belt in the deformation zone at the depth of engagement, wherein the deformation zone is formed between a first section of a plurality of teeth and grooves of the first activation belt and a second section of a plurality of teeth and grooves of the second activation belt, wherein the first section of the first activation belt is supported by the series of back-up rollers, which comprise a first set of rollers and the second section of the second activation belt is supported by a second set of rollers and wherein the first set of rollers and the second set of rollers are arranged to force the first section of the plurality of teeth and grooves of the first activation belt into engagement with the second section of the plurality of teeth and grooves of the second activation belt and to control the depth of engagement therebetween, wherein each roller forming the first set of rollers is independently controllable with respect to the distance from the second set of rollers and is disposed directly opposite a roller forming the second set of rollers, each of which is independently controllable with respect to the distance from the first set of rollers, with the vertical position of one or both rollers forming an opposing pair is arranged such that the distance between each pair of opposing pairs of rollers is decreased an amount for each succeeding pair of rollers so that the depth of engagement increases continuously over the deformation zone.

7. The apparatus according to claim 6, wherein the depth of engagement is controlled to increase linearly over at least a portion of the deformation zone.

8. An apparatus for incrementally stretching a web, the apparatus comprising:
  a. a single activation roll comprising a plurality of circumferential teeth and grooves;
  b. an activation belt comprising a plurality of teeth and grooves that complement the plurality of circumferential teeth and grooves of the single activation roll;
  c. a deformation zone having a path length formed between a first section of the activation belt and an arcuate section of the single activation roll wherein the plurality of circumferential teeth and grooves of the single activation roll engage the plurality of teeth and grooves of the activation belt at a depth of engagement; and
  d. a series of back-up rollers supporting the first section of the activation belt along the path length, forcing the plurality of teeth and grooves of the activation belt into engagement with the plurality of circumferential teeth and grooves of the single activation roll and controlling the depth of engagement therebetween, said back-up rollers located adjacent to a side of the activation belt opposite a side of the activation belt that faces said single activation roll, said series of back-up rollers capable of forcing a section of the activation belt into engagement with the single activation roll, wherein there is a radial distance between an outer surface of the single activation roll and each of the back-up rollers, where there is a first back-up roller and a last back-up roller, and the radial distance between the outer surface of the single activation roll and each of the back-up rollers decreases an amount for each succeeding back-up roller from the first to the last back-up roller so that the depth of engagement increases continuously over the deformation zone.

9. The apparatus according to claim 8 wherein at least two of the back-up rollers are independently adjustable to control the depth of engagement and wherein the depth of engagement can be controlled to increase linearly over at least a portion of the deformation zone.

10. An apparatus for incrementally stretching a web, the apparatus comprising:
  a. a first activation belt comprising a plurality of teeth and grooves;
  b. a second activation belt comprising a plurality of teeth and grooves that complement the plurality of teeth and grooves of the first activation belt;
  c. a deformation zone having a path length formed between a first section of the first activation belt and a second section of the second activation belt wherein the plurality of teeth and grooves of the first activation belt engage the plurality of teeth and grooves of the second activation belt at a depth of engagement; and
  d. a first set of rollers supporting the first section of the first activation belt along the path length and a second set of rollers supporting the second section of the second activation belt along the path length wherein the first set of rollers and the second set of rollers are arranged to force the teeth and grooves of the first activation belt into engagement with the teeth and grooves of the second activation belt and to control the depth of engagement therebetween, wherein each roller forming the first set of rollers is disposed directly opposite a roller forming the second set of rollers to form opposing pairs of rollers, and at least two rollers disposed at different locations along the path length of the deformation zone are independently adjustable to change the depth of engagement in the deformation zone, and said pairs of rollers are arranged such that the distance between each pair of opposing pairs of rollers is decreased an amount for each succeeding pair of rollers so that the depth of engagement increases continuously over the deformation zone.

11. The apparatus according to claim 10 wherein the rollers forming the first and second sets of rollers are independently adjustable to change the depth of engagement and wherein the depth of engagement can be controlled to increase linearly over at least a portion of the deformation zone.

12. An apparatus for incrementally stretching a web wherein the apparatus occupies a space in a machine direction which is less than about 3.0 meters, the apparatus comprising:
  a. a single activation roll comprising a plurality of circumferential teeth and grooves;
  b. an activation belt comprising a plurality of teeth and grooves that complement the plurality of circumferential teeth and grooves of the single activation roll;
  c. a deformation zone having a path length of at least about 0.05 meters formed between the activation belt and the single activation roll wherein the plurality of circumferential teeth and grooves of the single activation roll engage the plurality of teeth and grooves of the activation belt at a depth of engagement; and
  d. a series of back-up rollers arranged along the path length of the deformation zone forcing the activation belt into engagement with the single activation roll and controlling the depth of engagement therebetween, said back-up rollers located adjacent to a side of the activation belt opposite a side of the activation belt that faces said single activation roll, said series of back-up rollers capable of forcing a section of the activation belt into engagement with the single activation roll, wherein there is a radial distance between an outer surface of the single activation roll and each of the back-up rollers, where there is a first back-up roller and a last back-up roller, and the radial distance between the outer surface of the single activation roll and each of the back-up rollers decreases an amount for each succeeding back-up roller from the first to the last back-up roller so that the depth of engagement increases linearly/continuously over the deformation zone.

13. An apparatus for incrementally stretching a web wherein the apparatus occupies a space in a machine direction which is less than about 3.0 meters, the apparatus comprising:
   a. a first activation belt comprising a plurality of teeth and grooves;
   b. a second activation belt comprising a plurality of teeth and grooves that complement the plurality of teeth and grooves of the first activation belt;
   c. a deformation zone having a path length of at least about 0.05 meters formed between a first section of the first activation belt and a second section of the second activation belt wherein the plurality of teeth and grooves of the first activation belt engage the plurality of teeth and grooves of the second activation belt at a depth of engagement; and
   d. a first set of rollers supporting the first section of the first activation belt and a second set of rollers supporting the second section of the second activation belt wherein the first set of rollers and the second set of rollers are arranged to force the teeth and grooves of the first activation belt into engagement with the teeth and grooves of the second activation belt and to control the depth of engagement therebetween, wherein each roller forming the first set of rollers is independently adjustable with respect to the distance from the second set of rollers and is disposed directly opposite a roller forming the second set of rollers, each of which is independently adjustable with respect to the distance from the first set of rollers, where the vertical position of one or both rollers forming an opposing pair is arranged such that the distance between each pair of opposing pairs of rollers is decreased an amount for each succeeding pair of rollers so that the depth of engagement increases continuously over the deformation zone.

14. An apparatus for incrementally stretching a web, the apparatus comprising:
   a. a single activation member comprising a plurality of teeth and grooves;
   b. an activation belt comprising a plurality of teeth and grooves that complement the plurality of teeth and grooves of the single activation member, wherein the single activation member and the activation belt occupy a space in a machine direction of less than 3.0 meters;
   c. a deformation zone formed between the activation belt and the single activation member wherein the plurality of teeth and grooves of the single activation member engage the plurality of teeth and grooves of the activation belt at a controlled depth of engagement along a path length of at least about 0.15 meters; and
   d. a series of back-up rollers located adjacent to a side of the activation belt opposite a side of the activation belt that faces said single activation member, said series of back-up rollers capable of forcing a section of the activation belt into engagement with the single activation member, wherein there is a radial distance between an outer surface of the single activation member and each of the back-up rollers, where there is a first back-up roller and a last back-up roller, and the radial distance between the outer surface of the single activation member and each of the back-up rollers decreases an amount for each succeeding back-up roller from the first to the last back-up roller so that the depth of engagement increases continuously over the deformation zone.

* * * * *